(12) United States Patent  (10) Patent No.: US 6,742,459 B2
Lucas  (45) Date of Patent: Jun. 1, 2004

(54) SYSTEM AND METHOD FOR PRODUCING A DISPOSABLE/RECYCLABLE PALLET

(75) Inventor: Philip J. Lucas, Golden, CO (US)

(73) Assignee: Coors Global Properties, Inc., Lakewood, CO (US)

( * ) Notice: Subject to any disclaimer, the term of this patent is extended or adjusted under 35 U.S.C. 154(b) by 120 days.

(21) Appl. No.: 10/033,029

(22) Filed: Dec. 26, 2001

(65) Prior Publication Data

US 2002/0129748 A1 Sep. 19, 2002

Related U.S. Application Data

(63) Continuation-in-part of application No. 09/809,678, filed on Mar. 14, 2001.

(51) Int. Cl.[7] .............................................. B65D 19/44
(52) U.S. Cl. ........................ 108/55.1; 53/447; 53/441
(58) Field of Search ...................... 108/57.25, 51.11; 53/55.1, 399, 396, 397, 447; 206/441, 442, 497, 597, 599, 600, 526, 386

(56) References Cited

U.S. PATENT DOCUMENTS 3,730,417 A  *  5/1973  Lawson ...................... 206/598
4,396,122 A      8/1983  Thimon
5,111,931 A      5/1992  Gombos et al.
5,269,645 A  * 12/1993  Winski ........................ 206/597
5,701,722 A     12/1997  Franklin et al.
6,050,419 A      4/2000  Flanagan et al.
6,152,678 A     11/2000  King et al.
6,579,053 B1 *  6/2003  Grams et al. ................ 414/269

OTHER PUBLICATIONS

Brochure: Alvey 920–Series Palletizers.
Brochure: Lantech Q–Series Stretch Wrapping Systems.
Brochure: Mectra Palletizers.
Brochure: Orion Stretch Packaging Systems.

* cited by examiner

Primary Examiner—Jose V. Chen
(74) Attorney, Agent, or Firm—Klaas, Law, O'Meara and Malkin, P.C.; William P. O'Meara; Nellie C. Kaufman

(57) ABSTRACT

The disclosure is directed to a system and method for producing a load of packages supported by a disposable/recyclable pallet. The system may comprise at least one palletizing station for producing a plurality of unwrapped palletized tiers of packages, a horizontal wrapping station for producing at least one horizontally wrapped palletized tier of packages, a stacking station for stacking the unwrapped palletized tiers of packages on the horizontally wrapped palletized tier of packages, and a base applicator for fixedly applying a base to a bottom surface of the horizontally wrapped palletized tier of packages.

41 Claims, 20 Drawing Sheets

SYSTEM AND METHOD FOR PRODUCING A DISPOSABLE/RECYCLABLE PALLET

CROSS-REFERENCE TO RELATED APPLICATION

The present application is a continuation-in-part of co-pending U.S. patent application Ser. No. 09/809,678 filed Mar. 14, 2001 for DISPOSABLE/RECYCLABLE PALLET AND METHOD of Philip J. Lucas et al., which is hereby specifically incorporated by reference for all that is disclosed therein.

FIELD OF THE INVENTION

The present invention relates generally to pallets used to support and transport a load of packages, and, in particular, to systems and methods for producing a disposable and/or recyclable pallet.

BACKGROUND OF THE INVENTION

Pallets are typically used to support a load of packages, allowing the load to be lifted and transported by a lift truck such as a forklift. Several layers of packages may be loaded onto a pallet, and the load may then be secured around its circumference using, for example, flexible wrap or shrink wrap in order to stabilize the load on the pallet.

Some pallets have a platform upon which the packages are loaded and a base having channels adapted to receive the "forks" of a forklift. These pallets, hereinafter referred to as "platform-type pallets", are typically constructed from wood or plastic, and may be re-used multiple times. Disadvantages to using platform-type pallets involve the cost of producing the pallet, space required for and cost of storing the pallets, cost of shipping the pallet and its load to their destination, and cost and inconvenience of shipping the pallet back from its destination so it may be reused. The shipping costs are even more significant for relatively heavier pallets (e.g., wood pallets). Due to weight restrictions, the amount of product that can be shipped with the relatively heavier pallets is reduced. Furthermore, while these pallets are generally reusable, they are subject to breakage (especially wood pallets).

A relatively thin and lightweight alternative to a platform-type pallet is known as a "slip sheet" or "slip pallet". Referring to FIG. 1, a conventional slip pallet 10 may be, for example, a thin sheet of lightweight material such as plastic having one or more extending edges 12. The slip pallet 10 is loaded with packages 20 and the packages are usually wrapped around the circumference of the load (i.e., around a vertical axis) in order to stabilize the load 22. A specially adapted lift truck 24 grasps an edge, e.g. 12, of the slip pallet 10, pulls the slip pallet 10 onto a platform 26, and then lifts and transports the load 22 as desired. As the load 22 is lifted and transferred onto the platform 26, the weight of the load 22 shifts from the leading end 14 to the opposite (trailing) end 16 (as indicated by "L1" and "L2"), possibly damaging packages (e.g., 20a, 20b) located on the lowermost layers 18 on these ends 14, 16. The greater the lift angle "A", the greater the weight "L2" exerted on the packages (e.g., 20b) located on the trailing end 16, especially those on the lowermost layers 18.

Using either a platform-type pallet or a slip pallet, additional damage may occur to the lowermost layers of packages during shipping due to vibration and jostling of the load.

High-speed packaging operations often use an automated system for "palletizing" a load of packages which is typically referred to as a "palletizer". The term "palletizing" as used throughout this application refers to arranging a plurality of packages (which includes any type of container, product, etc.) into a desired pattern (typically, but not necessarily having a square or rectangular "footprint") to form a "palletized tier". The term "palletized tier" as used throughout this application refers to a single layer of adjacent packages arranged into a desired pattern. The term "load" as used throughout this application refers to a stack of palletized tiers.

Examples of conventional palletizer systems are the 920-series palletizers manufactured by Alvey Systems, Inc., 9301 Olive Boulevard, St. Louis, Mo., 63132 (see "www.alvey.com"); or the 520-series palletizers manufactured by Mectro/Emmeti USA, 101 Sherwood Drive, Boalsburg, Pa. 16827. An example of a conventional palletizer system 300 is schematically shown in FIGS. 7 and 8.

With reference to FIGS. 7 and 8, a conventional palletizer system 300 may include an infeed conveyor 302 and an output conveyor 398. As used herein, the term "downstream" generally refers to directions of conveyance away from the infeed conveyor 302 and/or toward the output conveyor 398. The term "upstream" generally refers to directions of conveyance toward the infeed conveyor 302 and/or away from the output conveyor 398. The terms "upstream" and "downstream" do not necessarily refer to particular physical directions, since a package or load may change directions while traveling "upstream" or "downstream" depending on the physical layout of the system 300. The term "lateral" (or "laterally", etc.) refers to directions of conveyance which are generally perpendicular to an "upstream" or "downstream" direction. In FIGS. 7 and 8, exemplary downstream directions are shown by arrows with reference numeral "301" exemplary upstream directions are shown by arrows with reference numeral "303", and exemplary lateral directions are shown by arrows with reference numeral "305".

As shown in FIGS. 7 and 8, the infeed conveyor 302 conveys packages 304 in a longitudinal (and possibly somewhat vertically declined), downstream direction 301 to a palletizing station 306 at which packages 304 may be arranged into a palletized tier 370 of adjacent packages 304. The palletizing station 306 may include a first conveyor portion 308 having a plurality of guide slats 310 mounted on a conveyor 312 such as, for example, a plurality of rollers 314. Specifically, each of the guide slats 310 may be slidably mounted between a pair of rollers 314. A guide slat control mechanism (not shown, but known in the art) may be adapted to slide the guide slats 310 laterally 305 in order to guide each of the packages 304 laterally 305 (FIG. 7) and downstream 301 to a desired location on the second conveyor portion 320.

The second conveyor portion 320 may comprise a re-orientation mechanism 322 which is adapted to re-orient certain packages (e.g. 304a, FIG. 7) generally perpendicularly to a package's infeed orientation in order to create a desired palletized tier pattern. The re-orientation mechanism 322 may comprise, for example, several package turning devices 324,325 which are adapted to contact particular packages (e.g., 304a) while being conveyed downstream in order to turn the packages 90 degrees from their infeed orientation (see packages 304 on infeed conveyor 302, FIG. 7). A palletizer system 300 may be adapted to create a number of different palletized tier patterns with packages 304, as is well-known in the art. The pattern shown in FIGS. 7 and 8 (see the palletized tier 370) is merely exemplary of a desired pattern. The packages 304 may be conveyed downstream past the re-orientation mechanism 322 by any conventional conveyor 326 such as rollers 314, belts, chains, pusher bar assembly (described below) or the like and arranged into a loosely-formed tier 328 at the second conveyor portion 320. A stopping device 330 such as a retractable elongate plate or the like may be provided which is adapted to periodically halt the downstream flow of packages 304 in order to divide the packages into tier-sized groups and to longitudinally tighten up the loosely-formed tier 328.

The tier 328 may then be conveyed downstream by any conventional conveyor 331 such as rollers 314 to a third conveyor portion 332. As shown in FIG. 7, the palletizing station 306 may include lateral guides 334, 336 which are adapted to gradually laterally 305 guide the packages 304 into a more tightly-formed tier 340 at the third conveyor portion 332. The lateral guides 334, 336 may be comprised of a plurality of rollers 338 or the like as shown in FIG. 7 in order to minimize friction between the guides 334, 336 and the packages 304 as the packages are being conveyed downstream. A pusher bar assembly 342 or other type of conveyor (e.g., belt or rollers) may be provided at the third conveyor portion 332 in order to convey the tier 340 (FIG. 7) downstream from the palletizing station 306 to a stacking station 350. As best shown in FIG. 8, the pusher bar assembly 342 may comprise a pair of revolving pusher bars 344, 346 which may be mounted on an endless chain, belt, or the like, and translated along a path 348. The pusher bars 344, 346 may be mounted generally diagonally opposite one another as shown in FIG. 8 so that one of the pusher bars (e.g., 344) may serve as a stopping device as shown in FIG. 7 in order to temporarily halt the downstream flow of packages until the entire tier 340 is within the third conveyor portion 332. When the entire tier 340 is within the third conveyor portion 332 as shown in FIG. 7, the first pusher bar 344 may be translated along the path 348 (FIG. 8) up and away (upstream) from the stacking station 350 while the second pusher bar 346 is translated along the path 348 down and toward (downstream) the stacking station 350. The second pusher bar 346 may then contact the tier 340 and push it downstream to the stacking station 350. The second pusher bar 346 may then serve as a stopping device in order to temporarily halt the downstream flow of packages until another palletized tier is within the third conveyor portion 332.

As best shown in FIG. 8, at the stacking station 350, several palletized tiers (e.g., 370, 372, 374) may be stacked on one another and on a pallet 366 which may be, for example, a wooden pallet or a slip pallet (e.g., 10, FIG. 1) to form a load 376. As shown in FIG. 7, the stacking station 350 may include several guides 352, 354, 356 which, along with the pusher bar assembly 342, urge the packages 304 into a palletized tier 370 of adjacent packages 304. The stacking station 350 may include a retractable plate 360, FIG. 8, for arranging a palletized tier 370 thereon. The retractable plate 360 may be adapted to open ("retract") and close as needed. Referring to FIG. 8, in order to assist in stacking the tiers (e.g., 370, 372, 374), the stacking station 350 may comprise a lift 362 (also referred to as a "lowerator") which is adapted to lower the load 376 by the height of a tier "T1" as each subsequent tier is conveyed onto the load. The lift 362 may comprise a lift platform 364 which is translatable in a generally vertical direction "Y1" (FIG. 8). As a palletized tier (e.g., 370) is positioned on the retractable plate 360, the lift platform 364 may be translated to a position (shown in solid lines in FIG. 8) directly beneath the plate 360. When the plate 360 opens or retracts, the palletized tier 370 may drop slightly onto a pallet 366 which has been placed on the lift platform 364. The lift platform 364 is then lowered in a vertical direction Y1 a distance T1. The plate 360 may then close and another palletized tier (e.g., 372) may be conveyed onto the plate 360. When the plate 360 is again retracted, the second palletized tier (e.g., 372) is placed on the first palletized tier (e.g., 370). In this manner, as many tiers as desired are stacked in order to form the load 376.

As shown in FIGS. 7 and 8, the palletizer system 300 may further comprise a pallet feeding station 368 which is adapted to store a supply of pallets 366 and transfer a pallet 366 as needed to the lift platform 364. The pallet feeding station 368 may be located, for example, adjacent to the lift 350. Each pallet 366 may be transferred to the lift platform 364 using a movable fork mechanism (not shown) or the like which is adapted to lift each pallet 366 from its storage location and transfer the pallet 366 to the lift platform 364. As noted above, a pallet feeding station may alternately be adapted to transfer slip pallets (e.g., 10, FIG. 1) to the lift platform 364. Slip pallets may be transferred to the lift platform 364, for example, manually or by using a mechanical transfer device (not shown).

The palletizer system 300 may further comprise a separator sheet assembly 378 which is adapted to store separator sheets (e.g., 380) and place a separator sheet 380 as needed on top of a palletized tier (e.g., 370, 372, 374) in order to separate the tiers. As best shown in FIG. 8, the separator sheet assembly 378 may comprise a translatable suction cup mechanism 382 or the like which is adapted to lift each separator sheet 380 and place it on a palletized tier.

After stacking, the palletizer system 300 may convey each completed load 376 downstream to a vertical wrapping station 384 in order to secure the load 376 around its circumference and stabilize the load 376 on the pallet 366, as is well-known in the art. In order to convey the load 376 downstream to the vertical wrapping station 384, the lift platform 364 may comprise a conveyor thereon (not shown, but typically comprised of one or more belts, chains, rollers, or the like). The lift platform conveyor may transfer the load 376 onto a conveyor 386 such as a plurality of rollers 387 or the like which convey the load 376 downstream to the vertical wrapping station 384.

As best shown in FIG. 8, the vertical wrapping station 384 may comprise a vertical stretch wrapper 388 which may be, for example, a conventional vertical stretch wrapper such as the Q-Series Stretch Wrapping System manufactured by Lantech, Inc., 11000 Bluegrass Pkwy., Louisville, Ky., 40299-2399 (see "www.lantech.com"). As shown in FIG. 8, a conventional vertical stretch wrapper 388 may comprise at least one supply of flexible film 390 generally vertically-oriented along axis EE which may be slidably mounted on a stretch wrapper mounting portion 392. The flexible film 390 may be driven in a vertical direction Y1 along the stretch wrapper mounting portion 392. The vertical stretch wrapper 388 may also comprise a turntable 394 which is adapted to continuously rotate the load 382 in direction R3 around a vertical axis FF while the supply of flexible film 390 is unwound and moved in direction Y1. This may continue until the entire load 382 is wrapped around its circumference with as much flexible film 390 as is desired, thereby resulting in a wrapped load 396 on a pallet 366. As shown in FIG. 8, the turntable 394 may also comprise a conveyor 395 such as rollers or the like in order to convey each completed, wrapped load 396 downstream on an output conveyor 398 (which may also comprise rollers or the like) for pickup by a lift truck (e.g., 24, FIG. 1).

SUMMARY OF THE INVENTION

The invention is directed to a system and method for producing a load of packages supported by a disposable/recyclable pallet. The system may comprise at least one palletizing station comprising at least one palletizer producing a plurality of unwrapped palletized tiers of packages. The system may further comprise a horizontal wrapping station located downstream from a palletizing station. The horizontal wrapping station may comprise at least one horizontal stretch wrapper to produce a horizontally wrapped palletized tier of packages. A stacking station may be located downstream from and accessible to the horizontal wrapping station and at least one of the palletizing stations. The stacking station may comprise a lift which receives and stacks a plurality of unwrapped palletized tiers of packages on the horizontally wrapped palletized tier of packages. The system may further comprise a base applicator which fixedly applies a base to a bottom surface of the horizontally wrapped palletized tier of packages.

The method may comprise arranging packages into a plurality of unwrapped palletized tiers of packages at one or more palletizing stations. Then, at a horizontal wrapping station, at least one of said unwrapped palletized tiers of packages may be wrapped with flexible film around two horizontal axes and a second horizontal axis to produce at least one horizontally wrapped palletized tier of packages. Unwrapped palletized tiers of packages may then be stacked on the horizontally wrapped palletized tier of packages to produce a load of packages. A disposable/recyclable base may then be applied to a bottom surface of the horizontally wrapped palletized tier of packages to produce a disposable/recyclable pallet.

BRIEF DESCRIPTION OF THE DRAWINGS

Illustrative and presently preferred embodiments of the invention are illustrated in the drawings in which.

DETAILED DESCRIPTION OF THE INVENTION

Figure 1:
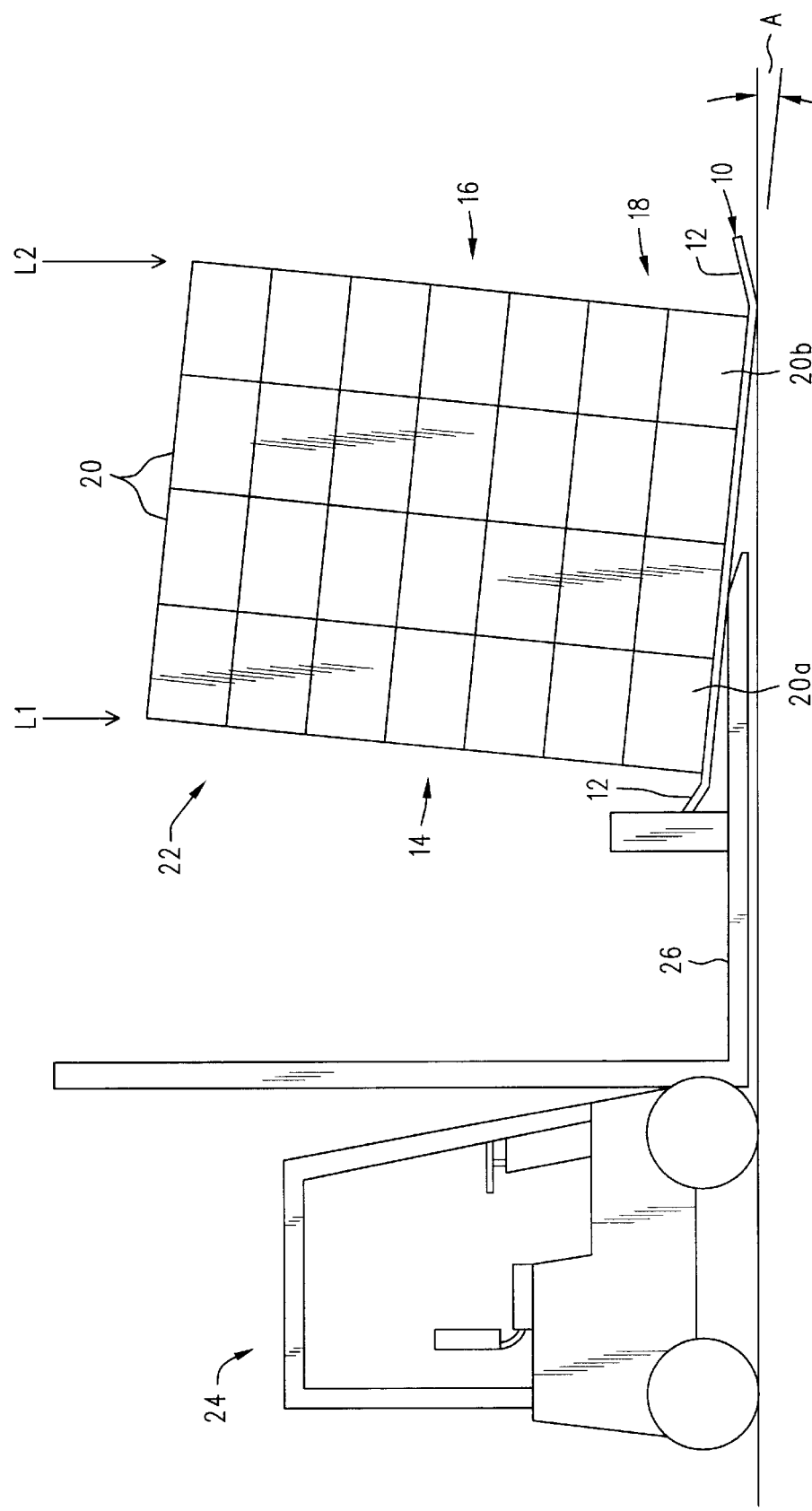
FIG. 1 is a side elevation view of a lift truck manipulating a load on a conventional slip pallet.
Figure 2:
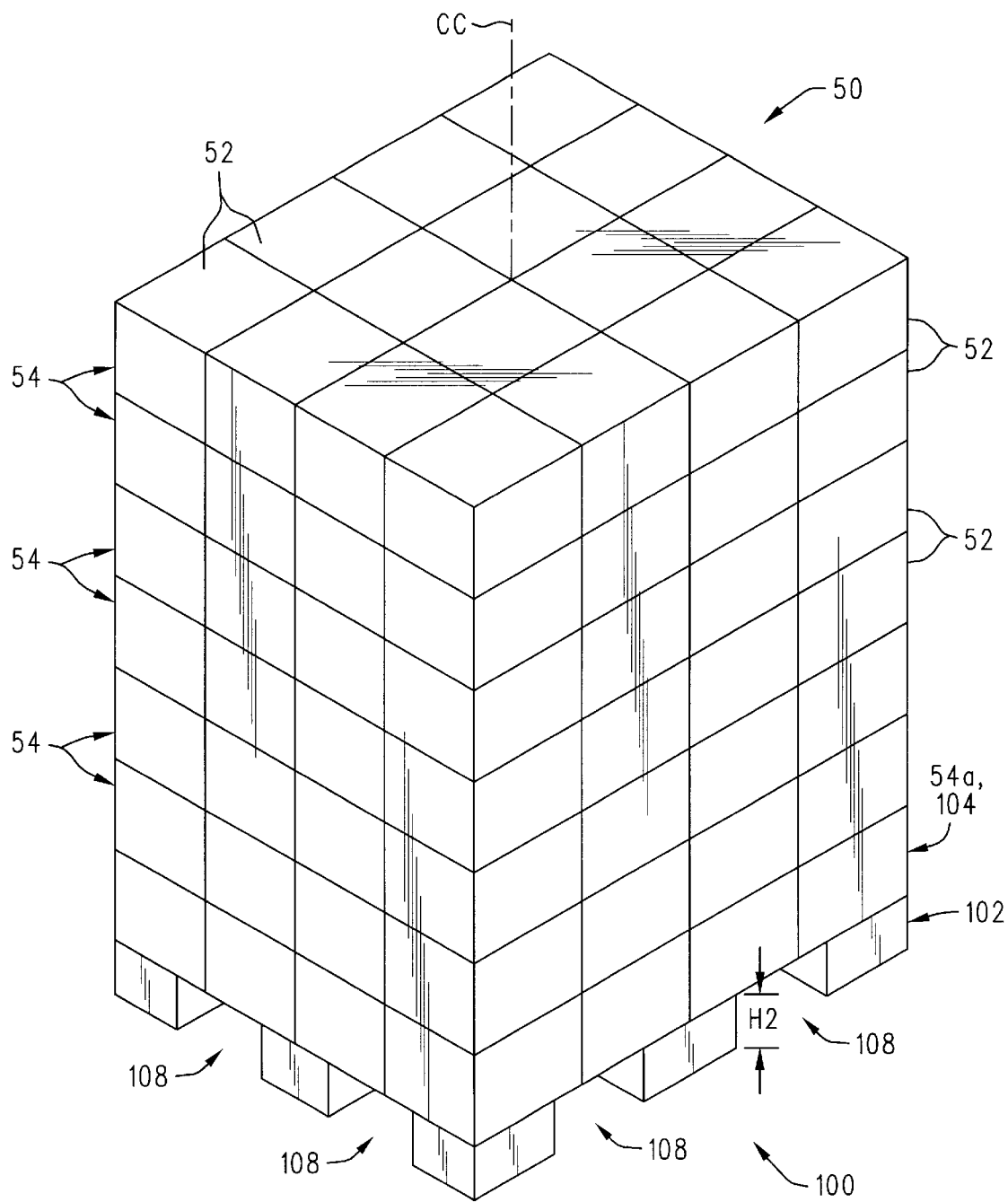
FIG. 2 is an isometric view of a load on a pallet according to an embodiment of the present invention.

As shown in FIG. 2, the pallet 100 of the present invention is adapted to support a load 50 of packages 52, allowing the load to be lifted and transported by a conventional lift truck such as a forklift. A typical load 50 is comprised of several layers 54, including a lowermost layer 54a. The packages 52 may be, for example, rectangular-shaped cartons as shown in the drawings. However, these packages 52 are merely exemplary, and it is to be understood that the pallet 100 of the present invention may be adapted to support other types of packages. Furthermore, the size of the load 50 shown is also merely exemplary, and the pallet 100 of the present invention may be adapted to support other load configurations. For example, several loads 50 and pallets 100 may be stacked on top of one another, and the lowermost pallet 100 may be adapted to support all of the other loads 50 and pallets 100 thereon.

Figure 3:
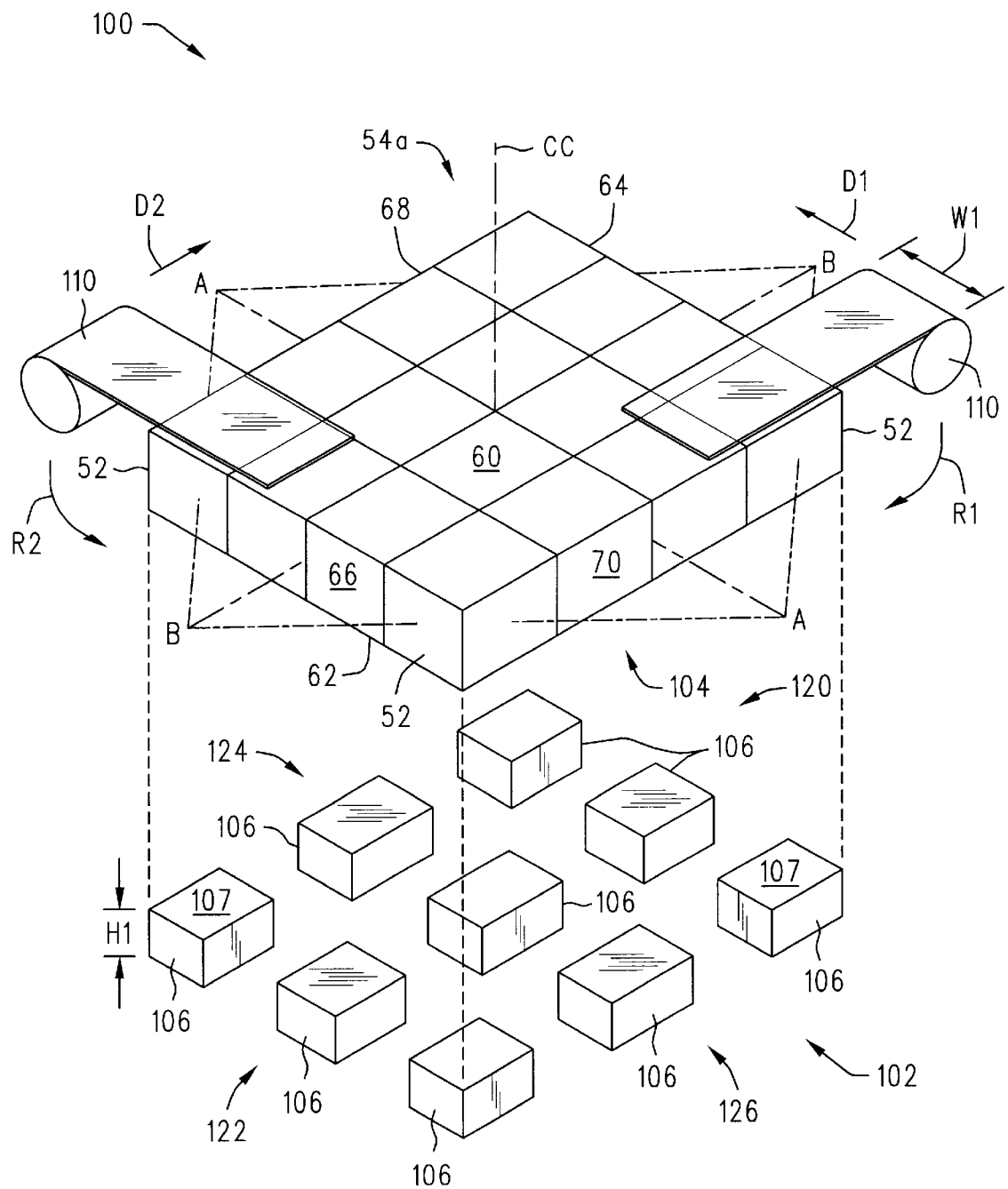
FIG. 3 is an isometric, exploded view of the pallet of FIG. 2 with the load removed.

As shown in FIGS. 2–3, the pallet 100 may comprise a base 102 and a support structure 104. The support structure 104 utilizes at least one of the lowermost layers (e.g., 54a) of the load 50 as a "platform" to support the remaining layers 54. While the lowermost layer 54a will be described relative to the support structure 104, it is to be understood that two or more layers 54 may be utilized to produce the support structure 104.

With reference to FIG. 3, a layer 54a of packages 52 is arranged adjacent to one another into a desired configuration, such as, for example, a square or rectangular configuration (commonly referred to as "palletization", or arranging packages into a pallet-sized layer). The layer 54a of packages 52 may comprise a top surface 60, a bottom surface 62, a first side surface 64, a second side surface 66, a third side surface 68, and a fourth side surface 70. The layer 54a of packages 52 is then wrapped in a flexible film 110 in the manner discussed below such that all of the surfaces 60, 62, 64, 66, 68, 70 (or at least a majority thereof are covered in flexible film 110, allowing the wrapped layer 54a to function as a "support structure" to support the remaining layers 54 (FIG. 2), similarly to the platform of a platform-type pallet. Then, the base 102, which may be comprised of multiple pieces 106 of lightweight material, is adhered to the flexible film 110 on the bottom surface 62 of the layer 54a. After loading the remaining layers 54 of packages 52 onto the pallet 100, the entire load 50 (FIG. 2), may be secured around its circumference (i.e., around side surfaces 64, 66, 68, 70 of layer 54a and the corresponding side surfaces of the remaining layers 54) using, for example, flexible wrap or shrink wrap in order to stabilize the load on the pallet as is well-known in the art. By utilizing one or more layers 54 of the load 50 for the support structure 104, the entire pallet 100 may be dismantled upon arrival to its destination, and the entire pallet 100 and load 50 may be utilized, recycled, and/or disposed of. Specifically, the layer (s) 54 of packages 52 used for the support structure 104 will, of course, be utilized by the end-user along with the rest of the load 50. The flexible film 110 covering the layer(s) 54 as well as the base 102 may be constructed from disposable/recyclable materials. Thus, upon dismantling the pallet 100, the flexible film 110 and the base 102 may be disposed of and/or recycled. The term "disposable/recyclable" as used throughout this application is intended to encompass the conventional definitions of both the terms "disposable" and "recyclable", since an end-user of a disposable/recyclable product usually has the option of whether to dispose of or recycle the product.

The flexible film 110 may be, for example, a plastic stretch wrap material such as, for example, polyethylene manufactured by ADU Stretch Films of Tulsa, Okla. The flexible film 110 may be wrapped around the packages 52 using conventional stretch wrap equipment such as that sold by Mima of Tamarac, Fla. (see "www.itwmima.com"). As shown in FIG. 3, the layer 54a of packages is preferably wrapped with flexible film 110 around two axes AA, BB. Specifically, the flexible film 110 may be applied to the top surface 60, first side surface 64, bottom surface 62, and second side surface 66 in a first direction, e.g., R1 (this direction may be either clockwise or counterclockwise), around axis AA. The film 110 is shifted along the load in direction D1, preferably overlapping the previous wrap somewhat, until all of the surfaces 60, 62, 64, 66 (or at least a majority thereof) are covered with flexible film 110. It may be desirable to cover the surfaces 60, 62, 64, 66 with more than one layer of flexible film 110, as described in further detail below. The flexible film 110 may then be applied to the top surface 60, third side surface 68, bottom surface 62, and fourth side surface 70 in a second direction, e.g., R2 (again, this direction may be either clockwise or counterclockwise), around axis BB. The film is shifted along the load in direction D2, preferably overlapping the previous wrap somewhat, until all of the surfaces 60, 62, 68, 70 (or at least a majority thereof) are covered with flexible film 110. Again, it may be desirable to cover the surfaces 60, 62, 68, 70 with more than one layer of flexible film 110, as described in further detail below. It may also be desirable to leave one or more openings (not shown) within the flexible film 110 on one or more of the surfaces (in particular, on the bottom surface 62 and one or more of the side surfaces 65, 66, 68, 70) to allow for drainage of a leaking package 52. The axes AA, BB are most preferably located on the same plane (e.g., horizontal plane ABAB), and these axes AA, BB may be generally perpendicular to one another as shown in FIG. 3, so that the top surface 60 and bottom surface 62 are covered with twice as much flexible film 110 as the sides 64, 66, 68, 70.

As noted above, the base 102 is adhered to the flexible film 110 on the bottom surface 62 of the layer 54a. The base 102 must therefore be strong enough to support the entire load 50 (as well as other loads and disposable/recyclable pallets which may be stacked on top of this load as noted above), and is preferably constructed of a lightweight, recyclable/disposable material such as the plastic foam (polystyrene) known as "Styrofoam". By utilizing a resilient material such as plastic foam, the base 102 provides a shock-absorbing effect and is a damper to harmonic oscillations which minimizes damage to the packages 52 due to vibration and jostling of the load 50 during transportation thereof. However, the base 102 may be constructed from other materials such as rubber, plastic, or wood, including materials which have previously been recycled such as prefabricated wood.

The base 102 may be adhered to the flexible film 110 on the bottom surface 62 using any conventional adhesive such as two-sided tape. However, by using an injection-molded material such as plastic foam (a.k.a. Styrofoam), the need to use a separate adhesive may be avoided. Specifically, when plastic foam is removed from a mold, it remains tacky for a certain period of time. In a first method, a base 102 constructed from plastic foam may be pressed onto the flexible film 110 on the bottom surface 62 of the packages 52 while the base 102 is still tacky and then allowed to fully cure, thereby securing the base 102 to the flexible film 110. In another method, a base 102 constructed from plastic foam which has already cured may be utilized. At least one surface on the base 102 (e.g., surface 107 on each of the pieces 106, FIG. 3) may be heated until that surface 107 is tacky or partially melted. Then, the tacky surface 107 may be pressed to the flexible film 110 on the bottom surface 62 of the packages 52. When the base 102 cools down, it will be adhered to the flexible film 110.

Figure 4:
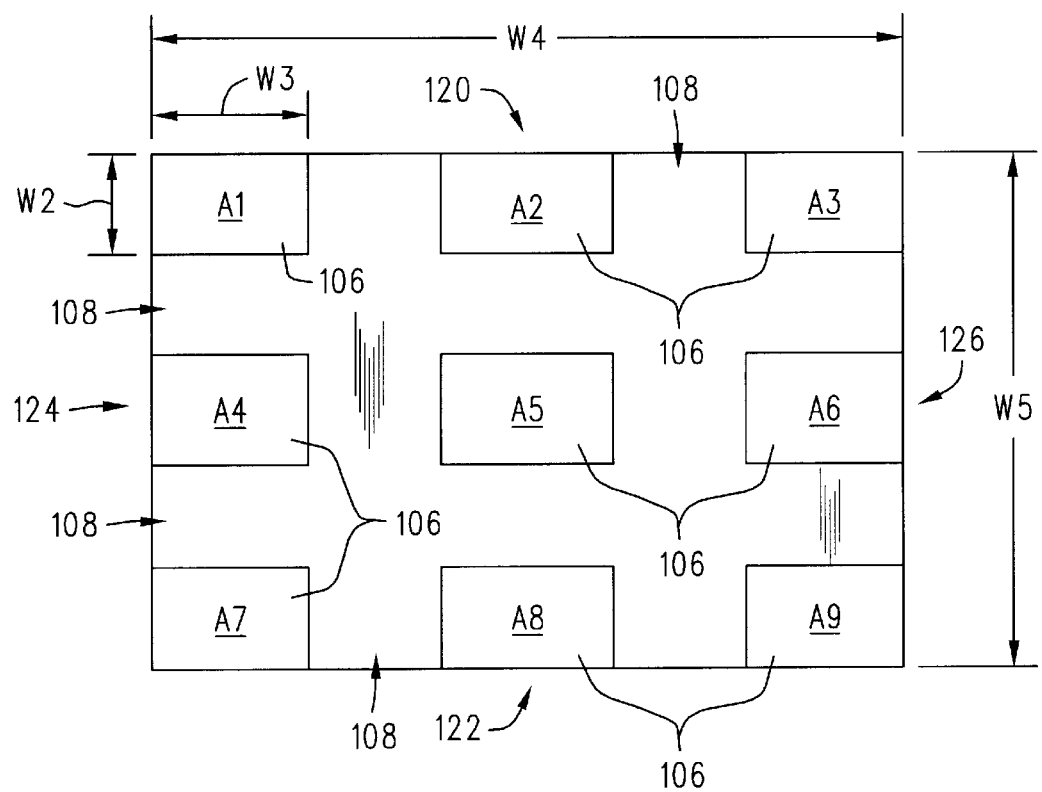
FIG. 4 is a bottom plan view of the pallet of FIG. 2.
Figure 5:
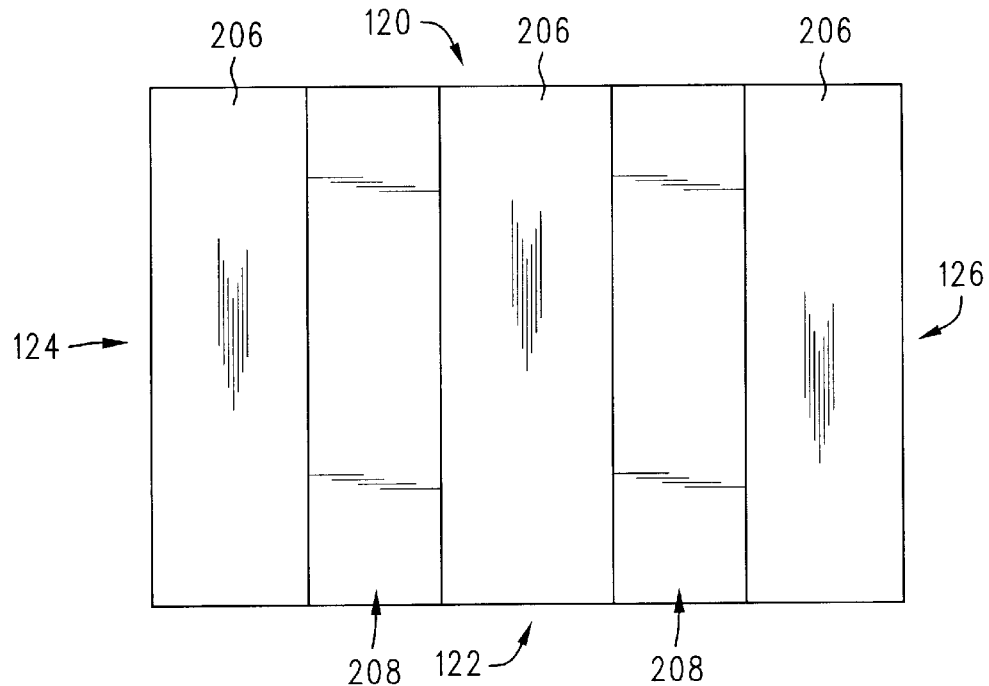
FIG. 5 is a bottom plan view of a pallet according to an alternative embodiment of the present invention.

As shown in FIGS. 2 and 4, the base 102 preferably includes channels 108 for receiving the forks (e.g., 56, FIG. 6) of a forklift. The base 102 may be adapted to receive the forks of a forklift from any side 120, 122, 124, 126 thereof as shown, or it may be adapted to receive a forklift from only two of those sides, e.g., 120, 122, as shown in FIG. 5. To create the channels 108 shown in FIGS. 2 and 4, an exemplary base 102 may be comprised of multiple pieces 106 as noted above. To create the channels 208 shown in FIG. 5, elongate pieces 206 may be provided which, other than their elongated shape, may be identical to the pieces 106 described herein. Alternatively (not shown), the base 102 may be comprised of a single piece of material as long as channels 108, 208 are provided for use by a forklift. For example, the pieces 106, 206 shown may be connected by thinner pieces of material within the channels 108, 208.

The pieces 106 should have a relatively uniform height "H1" (FIG. 3) which leaves enough clearance "H2" (FIG. 2) under the load 50 to allow the forks (e.g., 56, FIG. 6) of a forklift to be easily inserted into the channels 108. For example, the height of the pieces "H1" may be between approximately 3 and 4 inches. The clearance "H2" would be equal to the height of the pieces "H1" less any settling of the pieces 106 due to the weight of the load 50, the amount of settling depending partly on the material used for the base 102.

Referring now to FIG. 4, the pieces 106 may have any desired surface dimension, e.g., "W2" by "W3". While rectangular-shaped pieces 106 are shown in the drawings, it is to be understood that the pieces 106 may have any cross-sectional shape such as, for example, square, circular, or polygonal. Furthermore, the surface dimension of each pieces 106 need not be equal to the surface dimension of any other piece 106, except as necessary to create adequate channels 108. The "footprint" of the base is equal to the total surface area, for example "A1"+"A2"+"A3"+"A4"+"A5"+"A6"+"A7"+"A8"+"A9" of the pieces 106, where the surface area of each piece, e.g., "A1", is equal to the surface dimensions of each piece multiplied together, e.g., "W2"×"W3". The desired footprint as compared to the total surface area "W4"×"W5" of the bottom surface 62 depends on the weight of the load 50 as well as the material used for the base 102, as shown in the example below.

The particular characteristics of the flexible film 110 and the wrapping thereof, as well as the base 102, may vary according to particular characteristics of the load 50. As an example, a load 50 of packages 52 (which may contain, for example, filled beverage cans) may weigh approximately 2,200 lbs. To provide a sufficiently strong yet cost-efficient pallet 100 in accordance with the present invention, a flexible film 110 such as a plastic stretch wrap having a film gauge of between approximately 0.0075 and 0.0095 inches, and most preferably approximately 0.008 inches, may be utilized. This film 110 may have a pre-stretch of between approximately 100 and 200%, but most preferably closer to 200%. The stretch force setting on the stretch wrap equipment may be between approximately 20 and 50 lbs, and most preferably approximately 25 lbs. It should be noted that the film gauge and the stretch force setting should be carefully chosen with regard to the strength the packages and package contents. Specifically, a higher gauge film requires a higher stretch force setting, and a stretch force setting that is too high may cause damage to the packages 52 (especially cardboard packages).

In this example, the overlap noted above may be between approximately 25% and 40%, and most preferably approximately 30%, of the width "W1" (FIG. 3) of the flexible film 110. It was found that damage known as "corner crush" was minimized with a relatively low overlap (e.g., approximately 25% of "W1" in this example). However, lateral movement of the packages 52 was minimized with a relatively high overlap (e.g., approximately 50% of "W1"). Thus, the overlap may be adjusted to minimize the undesired effects. The total number of complete wraps around each axis AA, BB may be between three and five, i.e., the total number of layers of flexible film 110 in this example may be between six and ten. Should a stronger pallet be desired, and/or a heavier load applied, the total number of layers of flexible film may easily be increased, especially since the cost of the flexible film itself is typically relatively low.

To complete the pallet 100 described above, an exemplary base 102 constructed from 40-lb. to 60-lb. grade Styrofoam pieces 106 having a height "H2" of approximately 3 inches may be utilized. A base 102 having these characteristics may withstand a maximum load of approximately 40 lbs/in2. The exemplary load of 2,200 lbs. would preferably utilize a base with a footprint (as defined above) of between about 25% to 40%, and most preferably approximately 30%, of the total surface area "W4"×"W5" of the bottom surface 62 of the layer 54a. While a base having a larger footprint may be used, the larger the footprint, the more difficult it may be to insert the forks (e.g., 56, FIG. 6) of a forklift into the channels 108. It is clear that the base 102 of the present invention uses much less material than conventional pallets. Additionally, it will be appreciated that plastic foam/Styrofoam is a relatively inexpensive material as compared to the materials from which conventional pallets are constructed, e.g., plastic or wood.

Referring to FIGS. 2 and 3, after the pallet 100 is created by wrapping one or more layers (e.g., 54a) in flexible film 110 and adhering a base 102 thereto, the remaining layers 54 may be loaded onto the pallet 100. Then, the entire load 50 may be wrapped around its circumference, i.e., around axis CC (a vertical axis which is generally perpendicular to axes AA and BB, and plane ABAB), with flexible film such as stretch wrap, shrink wrap, or the like in a manner well known in the art in order to laterally secure the load 50.

Figure 6:
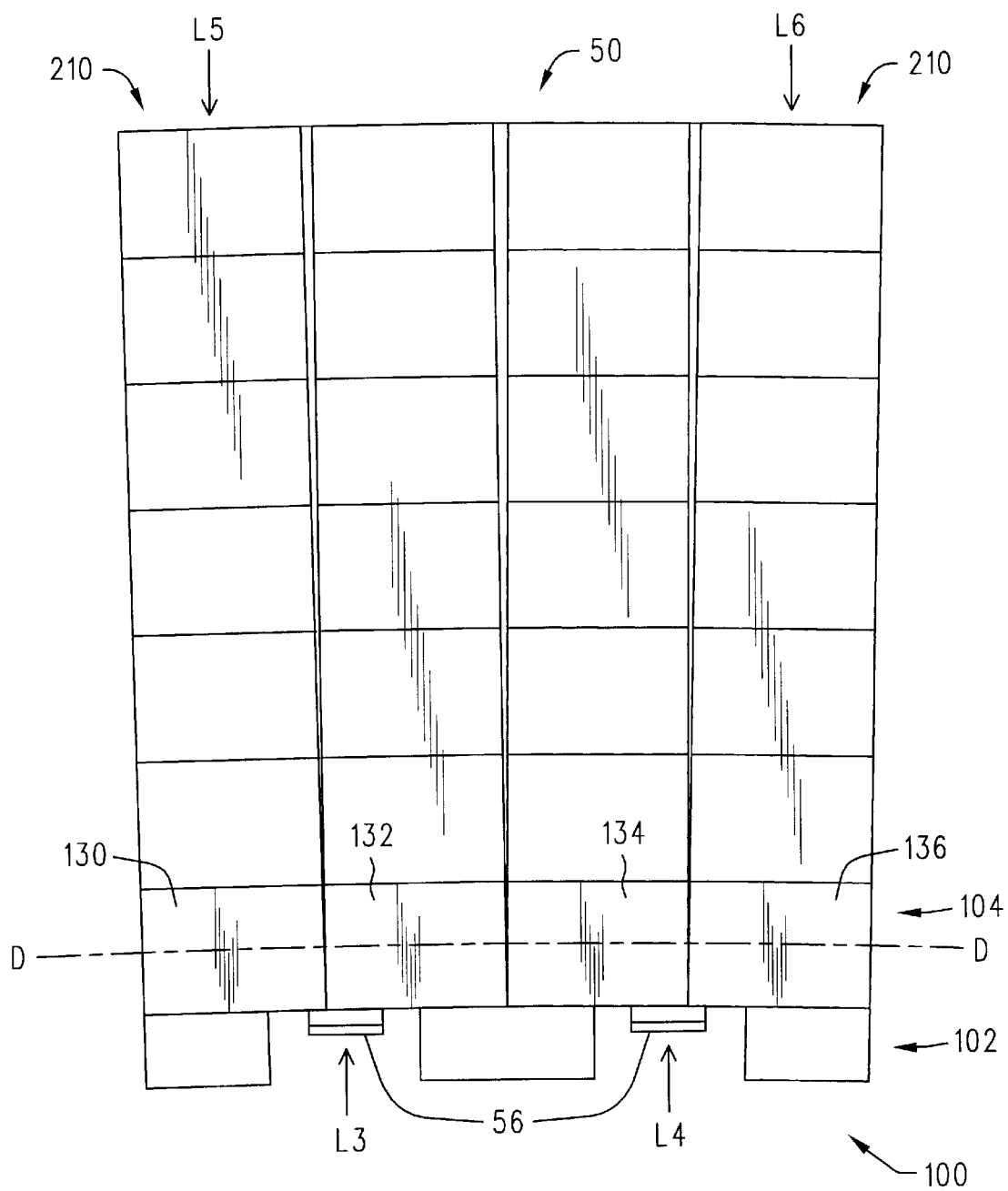
FIG. 6 is a front elevation view of a load on the pallet of FIG. 2 being lifted by the forks of a forklift.

FIG. 6 shows an exemplary load 50 on the pallet 100 of the present invention being lifted by the forks 56 of a forklift (not shown). When the wrapped load 50 is lifted, the lifting force "L3", "L4" of the forks 56 on the load 50 in combination with the weight "L5", "L6" of the outer periphery 210 of the load (e.g., the outer row(s) of packages) may cause the load to arch somewhat (as indicated by "DD"). However, since the support structure 104 of the pallet 100 is securely wrapped in two directions (e.g., around axes AA and BB, FIG. 3), and due to the friction between the individual packages (e.g., between packages 130 and 132, 132 and 134, 134 and 136) within the wrapped support structure 104, the support structure 104 does not allow this arching effect to threaten the stability of the load 50.

With reference to FIGS. 1–6, a method for producing the pallet 100 described above is also disclosed. The method may comprise the first step of wrapping at least one of the multiple layers (e.g., the lowermost layer 54a) of the load 50 with a flexible film 110 around a first axis AA or BB. The next step involves wrapping the same layer(s) 54a with a flexible film 110 around a second axis BB or AA which is generally perpendicular to the first axis and preferably located on the same plane ABAB. Then, a base 102 is adhered to the flexible film 110. If a plastic foam (polystyrene) such as Styrofoam is utilized for the base 102, the step of adhering the base 102 to the flexible film 110 may comprise providing plastic foam pieces which are not fully cured, pressing the plastic foam pieces onto the flexible film, and then allowing the plastic foam pieces to fully cure, thereby causing the pieces to adhere to the flexible film 110. Alternatively, as noted above, a base 102 constructed from plastic foam which has already cured may be utilized. At least one surface on the base 102 (e.g., surface 107 on each of the pieces 106, FIG. 3) may be heated until that surface 107 is tacky or partially melted. Then, the tacky surface 107 may be pressed to the flexible film 110 on the bottom surface 62 of the packages 52. When the base 102 cools down, it will be adhered to the flexible film 110.

Figure 9:
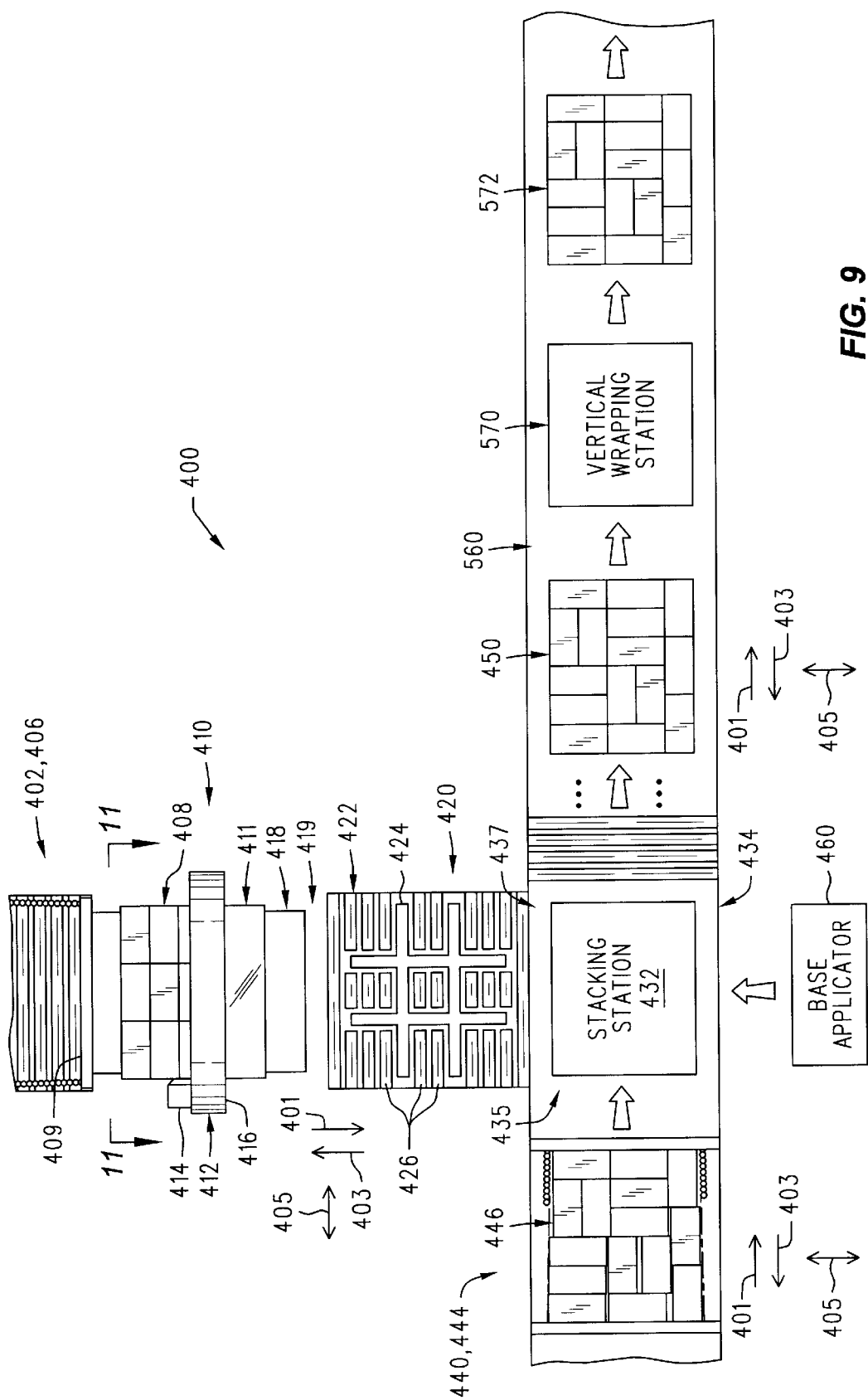
FIG. 9 is a schematic top plan view of a system for producing a disposable/recyclable pallet according to an embodiment of the present invention.
Figure 10:
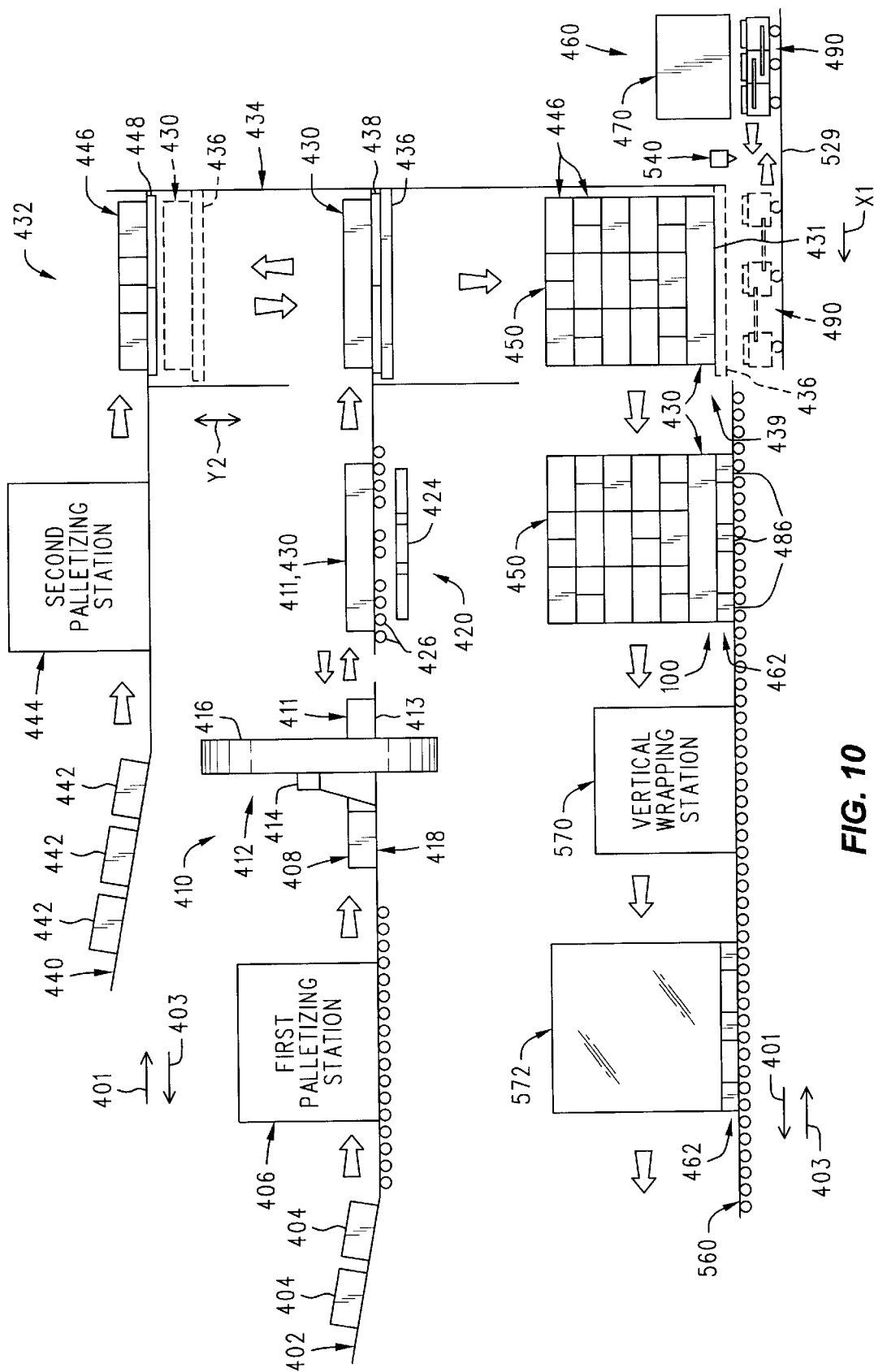
FIG. 10 is a schematic side elevation view of a system for producing a disposable/recyclable pallet according to an alternative embodiment of the present invention.

FIGS. 9 and 10 illustrate embodiments of a system 400 for producing a disposable/recyclable pallet 100 (described above), and, in particular, a system for producing a load of packages 450 supported by a disposable/recyclable pallet 100. The system 400 may comprise one or more infeed conveyors (e.g., 402, 440, FIG. 10) and one or more output conveyors (e.g., 560). As used herein, the term "downstream" generally refers to directions of conveyance away from an infeed conveyor 402, 440 and/or toward an output conveyor 560. The term "upstream" generally refers to directions of conveyance toward an infeed conveyor 402, 440 and/or away from the output conveyor 560. The terms "upstream" and "downstream" do not necessarily refer to particular physical directions, since a package or load may change directions while traveling "upstream" or "downstream" depending on the physical layout of the system 400. The term "lateral" (or "laterally", etc.) refers to directions of conveyance which are generally perpendicular to an "upstream" or "downstream" direction. In FIGS. 9 and 10, exemplary downstream directions are shown by arrows with reference numeral "401", exemplary upstream directions are shown by arrows with reference numeral "403", and exemplary lateral directions are shown by arrows with reference numeral "405".

With reference to FIG. 10, the system 400 may comprise a first infeed conveyor 402 and a second infeed conveyor 440. The first infeed conveyor 402 may, in an exemplary embodiment, be located below the second infeed conveyor 440. Alternatively or additionally, the second infeed conveyor 440 may be orientated generally perpendicularly to the first infeed conveyor 402 as shown in FIG. 9. Such configurations may be determined by the physical layout of the manufacturing facilities as described in further detail below.

Figure 7:
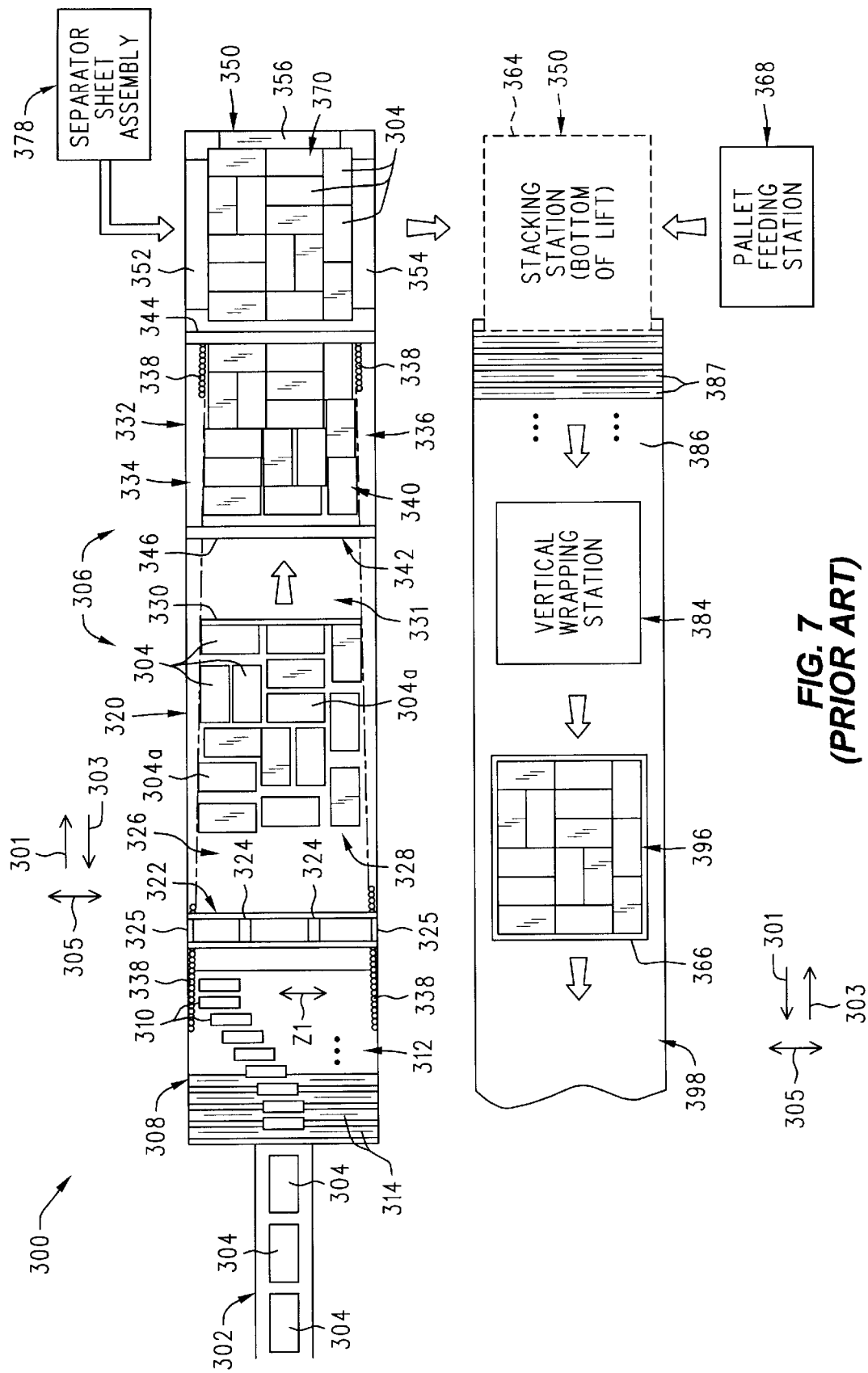
FIG. 7 is a schematic top plan view of a conventional palletizer system.
Figure 8:
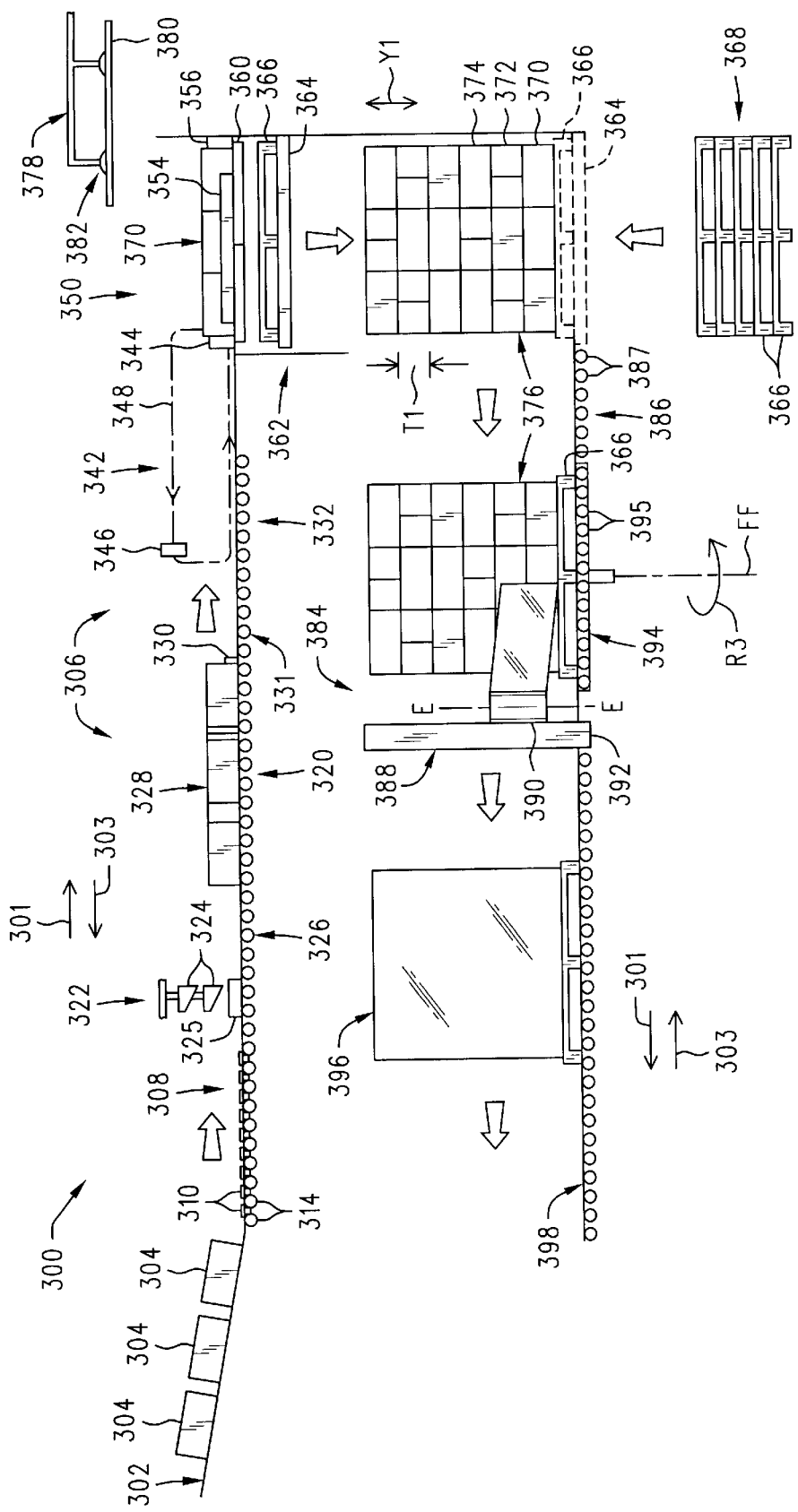
FIG. 8 is a schematic side elevation view of the conventional palletizer system of FIG. 7.

As shown in FIG. 10, the first infeed conveyor 402 may convey packages 404 in a longitudinal (and possibly somewhat vertically declined), downstream direction 401 to a first palletizing station 406. The first infeed conveyor 402 may be substantially the same as the infeed conveyor 302 (FIGS. 7 and 8) and the first palletizing station 406 may be substantially the same as the palletizing station 306 (FIGS. 7 and 8) on a conventional palletizer system 300 described above. However, instead of conveying a palletized tier 408 directly to a stacking station 432, the first palletizing station 406 may convey the palletized tier 408 downstream 401 by any conventional conveyor such as rollers, belts, chains, or the like, to a horizontal wrapping station 410. To assist in forming the palletized tier 408, the first palletizing station 406 may comprise a stopping device 409 (FIG. 9) which may be substantially the same as the stopping device 330 (FIG. 7) described above. The stopping device 409 may be retractable in order to allow the palletized tier 408 to be conveyed to the horizontal wrapping station 410. The stopping device 409 may alternatively be a component in a pusher bar assembly such as the pusher bar assembly 342 (FIG. 7) described above.

As best shown in FIG. 10, the second infeed conveyor 440 may convey packages 442 in a longitudinal (and possibly somewhat vertically declined), downstream direction 401 to a second palletizing station 444. The second infeed conveyor 440 may be substantially the same as the infeed conveyor 302 (FIG. 7) and the second palletizing station 444 may be substantially the same as the palletizing station 306 (FIG. 7) on a conventional palletizer system 300 (FIG. 7) described above. Also, like the conventional palletizer system 300, the second palletizing station 444 may palletize the packages 442 into a palletized (unwrapped) tier 446 and then convey each tier 446 (shown somewhat loosely palletized in FIG. 9) directly to the stacking station 432 as described in more detail below.

As noted above relative to FIGS. 7 and 8, a conventional palletizer system 300 may include a re-orientation mechanism 322 which is adapted to re-orient certain packages (e.g., 304*a*) in order to create a palletized tier pattern. However, with regard to the first and second palletizing stations 406, 444, the presence of a re-orientation mechanism 322 is optional. For example, the first palletizing station 406 may comprise a re-orientation mechanism (not shown, but may be identical to the re-orientation mechanism 322 in a conventional palletizer system 300, FIGS. 7 and 8) in order to produce patterned palletized tiers 446, while the second palletizing station 444 may eliminate the re-orientation mechanism in order to produce tiers 408 having packages oriented in the same direction.

Figure 11:
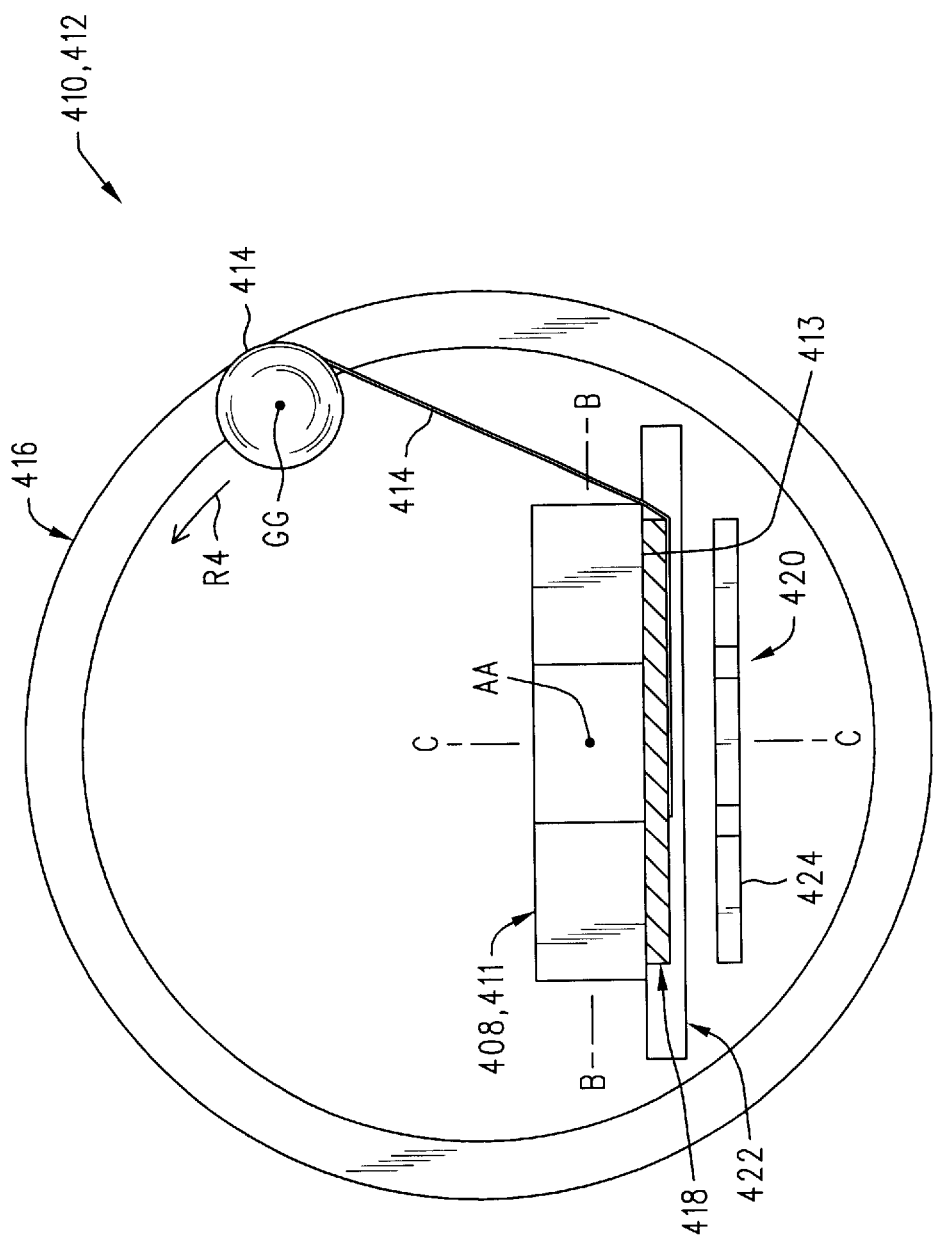
FIG. 11 is a front elevation view of a horizontal wrapping station of the system shown in FIGS. 9 and 10.

The horizontal wrapping station 410 may be positioned at any location adjacent to the first palletizing station 406 such as, for example, above or below the first palletizing station 406, or adjacent to any side thereof. As noted above relative to FIGS. 2–6, the disposable/recyclable pallet 100 may comprise a support structure 104 which is comprised of one or more layers of packages (e.g., 54*a*) which is horizontally wrapped in a flexible film 110, allowing the wrapped layer 54*a* to function as a "support structure" to support the remaining layers 54, similarly to the platform of a platform-type pallet. A horizontal wrapping station 410, FIGS. 9–11, may be utilized to create the support structure (which will be referred to below as a "horizontally wrapped palletized tier 430" or "fully wrapped tier 430"). As shown in FIGS. 9–11, the horizontal wrapping station 410 may comprise a horizontal stretch wrapper 412 which may be, for example, a conventional horizontal stretch wrapper such as a Lan-Ringer Stretch Packaging System manufactured by Lantech, Inc., 11000 Bluegrass Pkwy., Louisville, Ky., 40299-2399 (see "www.lantech.com"). Another example of a conventional horizontal stretch wrapper is the Constellation Series Stretch Packaging Systems manufactured by Orion, 5268 East Raines Rd., Memphis, Tenn., 38118 (see "www.orionpackaging.com"). As best shown in FIG. 11, the horizontal stretch wrapper 412 may comprise at least one supply of flexible film 414 generally horizontally oriented along axis GG which may be slidably, rotatably mounted on a stretch wrapper mounting portion 416 which encircles a conveyor 418. The flexible film 414 may be driven in a rotational direction R4 along the stretch wrapper mounting portion 416 while the palletized tier 408 is conveyed downstream 401 across the horizontal stretch wrapper 412 until the desired number of horizontal wraps (i.e., layers of flexible film 414) is achieved as described above relative to FIGS. 2–6. In order to achieve the desired number of wraps of film 414, the speed of the conveyor 418 may be varied and/or more than one supply of flexible film 414 may be utilized. For example, conveyance of the palletized tier 408 may be considerably slowed or completely halted while the tier 408 is wrapped several times (or wrapped one or more times with several supplies of flexible film 414). The tier 408 may then be conveyed downstream 401 without rotating the flexible film 414 to create an opening in the flexible film 414. The tier 408 may again be slowed or halted and wrapped, etc., until the entire tier 408 is wrapped. Such wrapping of the tier 408 may produce openings within the flexible film 414 to allow for drainage of a leaking package as described above relative to FIG. 3. After sufficiently wrapping the palletized tier 408, the film 414 may be cut at the horizontal wrapping station 410 as known in the art. As shown in FIGS. 10 and 11, the conveyor 418 at the horizontal wrapping station 410 is typically wrapped in flexible film 414 along with the palletized tier 408. As shown in FIGS. 9 and 11, as the partially wrapped tier 411 (or the fully wrapped tier 430 described below) exits the horizontal stretch wrapper 412 onto another conveyor 422, the partially wrapped tier 411 may pass over a gap 419 (FIG. 9) between conveyors 418, 422. As the partially wrapped tier 411 passes over the gap 419, the flexible film 414 is released from the conveyor 418 and allowed to conform to a bottom side 413 (FIGS. 10 and 11) of the partially wrapped tier 411.

With further reference to FIGS. 9–11, the horizontal wrapping station 410 may also comprise a rotating device 420 which may be located, for example, downstream 401 from the horizontal stretch wrapper 412. As described above relative to FIGS. 2–6, in order to form a disposable/recyclable pallet 100, the tier (54a, FIG. 3; 408, FIGS. 9–11) may be wrapped around two axes AA, BB. Referring to FIG. 11, in order to accomplish this with a single horizontal stretch wrapper 412, a first axis AA passing through the palletized tier 408 must be parallel to the flexible film axis GG during the initial wrapping of the tier 408, and a second axis BB must be parallel to the flexible film axis GG during the wrapping of the partially wrapped tier 411. The partially wrapped tier 411 may be rotated 90 degrees by the rotating device 420 in order to accomplish wrapping about both axes AA, BB.

The rotating device 420 may comprise any one of a variety of rotating devices such as a turntable as described above (e.g., 394, FIGS. 7 and 8) or the like. Alternatively, as shown in FIGS. 9 and 10, the rotating device 420 may comprise a cross table such as, for example, a "lift and turn table" manufactured by Lantech, Inc., 11000 Bluegrass Pkwy., Louisville, Ky., 40299-2399 (see "www.lantech.com"). As best shown in FIG. 9, a cross table 420 typically has a cross table portion 424 and a conveyor 422 which may be comprised of, for example, a plurality of rollers 426. The cross table portion 424 may be positioned such that it may be translated in a vertical direction Y2 (FIG. 10) between the rollers 426. For example, with reference to FIGS. 9–11, the cross table 420 may be translated in a vertical direction Y2 to a position above the rollers 426 so that the cross table portion 424 (rather than the rollers 426) contacts the partially wrapped tier 411. The cross table portion 424 may then rotate 90 degrees around axis CC (FIG. 11). Next, the cross table portion 424 may be translated in a vertical direction Y2 to a position below the rollers 426 so that the rollers 426 again contact the partially wrapped tier 411. This rotates the partially wrapped tier 411 from an orientation wherein axis AA (FIG. 11) is parallel to axis GG to an orientation wherein axis BB is parallel to axis GG. The partially wrapped tier 411 may then be conveyed by the rollers 426 of the conveyor 422 upstream 403 back to the horizontal stretch 412. The horizontal stretch wrapper 412 may then wrap flexible film 414 around the partially wrapped tier 411 circumferentially about the second axis BB. Upon exiting the horizontal stretch wrapper 412 for the second time, the flexible film 414 may be cut and the fully wrapped tier 430 (i.e., the "support structure" 104 described above) may be conveyed downstream 401 past the rotating device 420 to the stacking station 432.

Figure 12:
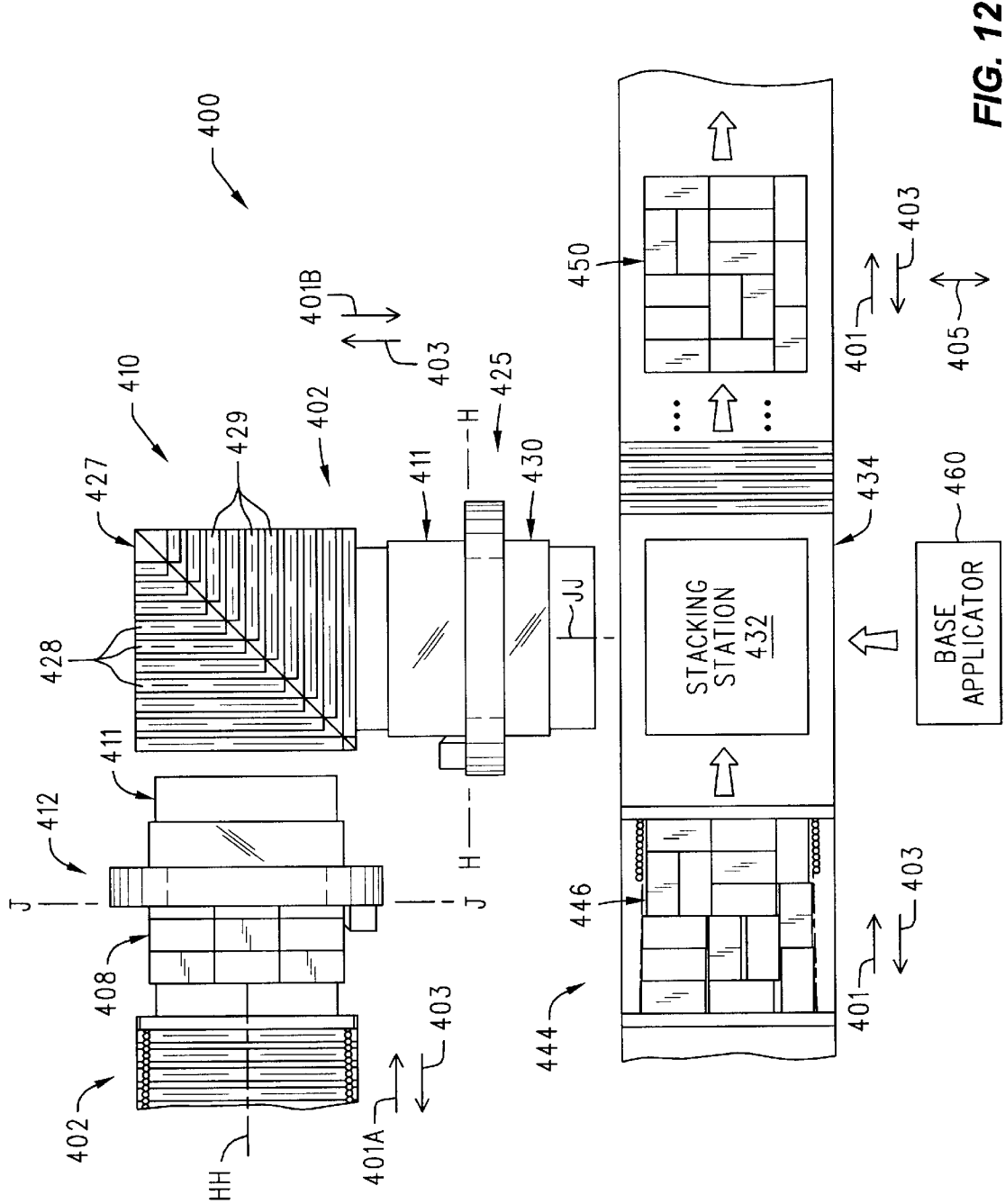
FIG. 12 is a schematic top plan view of another embodiment of the horizontal wrapping station.

As shown in FIG. 12, as an alternative to conveying the partially wrapped tier 411 upstream 403 back to the horizontal stretch wrapper 412 for a second wrap, the partially wrapped tier 411 may be conveyed to a second horizontal stretch wrapper 425 after rotation thereof. In other words, the tier 408 may be wrapped around the first axis AA at the first horizontal stretch wrapper 412 and around the second axis BB at the second horizontal stretch wrapper 425. In order to wrap around both axes AA, BB, the partially wrapped tier 411 must be re-oriented between the first horizontal stretch wrapper 412 and the second horizontal stretch wrapper 425. In order to re-orient the partially wrapped tier 411 for the second horizontal stretch wrapper 425, a rotating device is positioned between the stretch wrappers 412, 425. The rotating device utilized herein may be a device which rotates the tier 411 such as, for example, a turntable (e.g., 394, FIGS. 7 and 8) or a cross table (e.g., 420, FIGS. 9–11). However, since the partially wrapped tier 411 is conveyed downstream to a second horizontal stretch wrapper 425 rather than back upstream to the first horizontal stretch wrapper 412, a different type of rotating device may be utilized as shown in FIG. 12. That is, the rotating device may alternatively be a bi-directional conveyor 427 or the like. The bi-directional conveyor 427 may be one conventionally known in the art such as, for example, a "rotator roller assembly" manufactured by Lantech, Inc., 11000 Bluegrass Pkwy., Louisville, Ky., 40299-2399 (see "www.lantech.com"). As shown in FIG. 12, a bi-directional conveyor 427 may comprise a first plurality of rollers 428 which are adapted to convey the partially wrapped tier 411 exiting the first horizontal stretch wrapper 412 in a first downstream direction 401A onto a second plurality of rollers 429. The second plurality of rollers 429 is oriented perpendicularly to the first plurality of rollers 428. The rollers 428, 429 are adapted to vertically shift relative to one another such that their functions do not conflict. In other words, the first plurality of rollers 428 is oriented slightly higher than the second plurality of rollers 429 when the partially wrapped tier 411 is being conveyed by the first plurality of rollers 428 in the first downstream direction 401A, and the second plurality of rollers 429 is oriented slightly higher than the first plurality of rollers 428 when the partially wrapped tier 411 is being conveyed by the second plurality of rollers 429 in the second downstream direction 401B. The second plurality of rollers 429 then conveys the partially wrapped tier 411 in a second downstream direction 401B to the second horizontal stretch wrapper 425. Other than the difference in orientation, the second horizontal stretch wrapper 425 may be substantially the same as the first horizontal stretch wrapper 412 described above (although the horizontal stretch wrappers 412, 425 need not be identical).

Providing a second horizontal stretch wrapper 425 eliminates the need for conveying the wrapped tier 430 upstream 403 after rotation thereof, as described above, thereby enabling wrapping of a palletized tier 408 at the first horizontal stretch wrapper 412 simultaneously with wrapping of a partially wrapped tier 411 at the second horizontal stretch wrapper 425. Thus, by using two horizontal stretch wrappers 412, 425, a wrapped tier 430 may be provided in less time than with a single horizontal stretch wrapper 425. Depending on the type of load 450 (FIG. 10) needed, it may be necessary to provide a wrapped tier 430 in a relatively short amount of time. As an example, a load 450 may be comprised of nine unwrapped palletized tiers (e.g., 446, FIGS. 9 and 10) which is supported on a pallet 100 comprised of a wrapped tier (e.g., 430) and a base 462. In this example, one tier must be palletized and horizontally wrapped in two planes in the same or less time as nine tiers are palletized. That is, if it takes, for example, 90 seconds to palletize nine tiers, then one tier must be palletized and horizontally wrapped in two planes in 90 seconds or less. Each of the following may effectively reduce the amount of time it takes to horizontally wrap a tier in two planes: providing two horizontal stretch wrappers (e.g., 412, 425, FIG. 12) as described above; providing multiple sources of horizontally wrapped palletized tiers (i.e., one or more additional palletizing stations identical to the first palletizing station 406 leading to a horizontal wrapping station identical to the horizontal wrapping station 410 described above); and/or supplying each horizontal stretch wrapper with multiple supplies of flexible film.

Upon exiting the horizontal wrapping station 410, the wrapped tier 430 may be conveyed by any conventional conveyor downstream 401 to a stacking station 432. Like the stacking station 350 described above, the stacking station 432 may comprise a lift 434 (or "lowerator"). The lift 434 may be substantially the same as the conventional lift 362 described above, except that the lift 434 of the present invention may be adapted to accept both a wrapped tier 430 from the horizontal wrapping station 410 and an unwrapped palletized tier 446 from the second palletizing station 444. The lift 434 may comprise a lift platform 436 which is translatable in a generally vertical direction Y2. The specific configuration of the lift 434 may depend on the relative positions of the horizontal wrapping station 410 and the second palletizing station 444. It is to be understood that any lift which is adapted to accept tiers of packages from two separate locations may be utilized in the present invention. Exemplary configurations of the horizontal wrapping station 410 and the second palletizing station 444 include co-linear configurations and transverse configurations. Such configurations may be determined by the physical layout of the particular manufacturing facility at which the system is installed.

In the embodiment shown in FIG. 10 (a co-linear configuration), the lift 434 may further comprise a first retractable plate 438 upon which a wrapped tier 430 may be positioned. When the plate 438 is retracted, the wrapped tier 430 may drop slightly onto the lift platform 436. Unlike the lift platform 364 described above, the lift platform 436 of the present invention need not have any pallet 366 (FIGS. 7 and 8) or slip sheet thereon, i.e., the wrapped tier 430 may be placed directly onto the lift platform 436. The lift platform 436 with a wrapped tier 430 thereon may then be translated in direction Y2 to retrieve unwrapped palletized tiers (e.g., 446) formed at the second palletizing station 444. The lift 434 may further comprise a second retractable plate 448 upon which an unwrapped palletized tier 446 from the second palletizing station 444 may be positioned. In an embodiment where the second palletizing station 444 is positioned above the first palletizing station 406, the second retractable plate 448 may be positioned above the first retractable plate 438. When the lift platform 436 is translated to a position directly below the second retractable plate 448, the second plate 438 may be retracted and the unwrapped palletized tier 446 positioned thereon may drop slightly onto the wrapped tier 430 or other unwrapped tiers 446 in order to form the load 450. While the load 450 is being formed by stacking unwrapped palletized tiers 446 onto the lowermost horizontally wrapped palletized tier 430 and lift platform 436, the first retractable plate 438 may remain open to allow the lift platform 436, load 450, and tier 430 to pass thereby. The stacking station 432 may be provided with a separator sheet assembly (not shown, but may be substantially identical to separator sheet assembly 378 described above relative to FIGS. 7 and 8) for placing a separator sheet, if desired, on top of each tier 430, 446. It is to be noted that load 450 may be substantially identical to load 50 of FIG. 2.

In a transverse configuration shown in FIG. 9, the horizontal wrapping station 410 and the second palletizing station 444 are oriented perpendicularly to one another. With this configuration, the horizontal wrapping station 410 may be coplanar with the second palletizing station 444, rather than being positioned below the second palletizing station 444 as described above relative to FIG. 10. The lift 434 may be substantially the same as the conventional lift 362 described above, except, as noted above, the lift 434 of the present invention may be adapted to accept both the wrapped tier 430 from the horizontal wrapping station 410 and the unwrapped palletized tier 446 from the second palletizing station 444. Thus, the lift 434 may comprise a single retractable plate (not shown, but may be identical to either the first or the second retractable plate 438, 448 described above) and access to the platform 364 from two sides 435, 437 thereof. Alternatively, the horizontal wrapping station 410 may be oriented perpendicularly and below the second palletizing station 444 (non-co-planar). For example, side 437 may be open in a coplanar configuration or closed in a non-co-planar configuration. In a non-co-planar configuration, the lift 434 may comprise first and second retractable plates 438, 448 as described above relative to FIG. 10. Another exemplary configuration shown in FIG. 10 is a co-linear configuration whereby the horizontal wrapping station 410 and the second palletizing station 444 may be substantially parallel to one another, with the horizontal wrapping station 410 being situated below the second palletizing station 410 (non-co-planar). This configuration is described in more detail above. It is to be understood that the configurations shown and described herein are merely exemplary, and that any configuration which allows more than one source of palletized tiers (e.g., 430, 446) to be stacked to form a load 450 may be utilized in the present invention.

With reference to FIGS. 9, 10, and 13–17, the system 400 may further comprise a base applicator 460 which is adapted to fixedly apply a base 462 (FIG. 10) to the flexible film 414 on the bottom surface 431 (FIGS. 10 and 16) of the wrapped tier 430 as described above relative to base 102 and layer 54*a*, FIGS. 2 and 3. The base applicator 460 may fixedly apply a base 462 to the wrapped tier 430 while the tier 430 is at any location between the horizontal wrapping station 410 and the output conveyor 560 (described below). In other words, the base 462 may be applied to the flexible film 414 on the bottom surface 431 of the wrapped tier 430 at any time after formation of the wrapped tier 430. For example, in the embodiments shown schematically in FIGS. 9 and 10, the base 462 may be applied to the wrapped tier 430 while the wrapped tier 430 with the load 450 thereon is at the bottom 439 of the lift 434.

Figure 13:
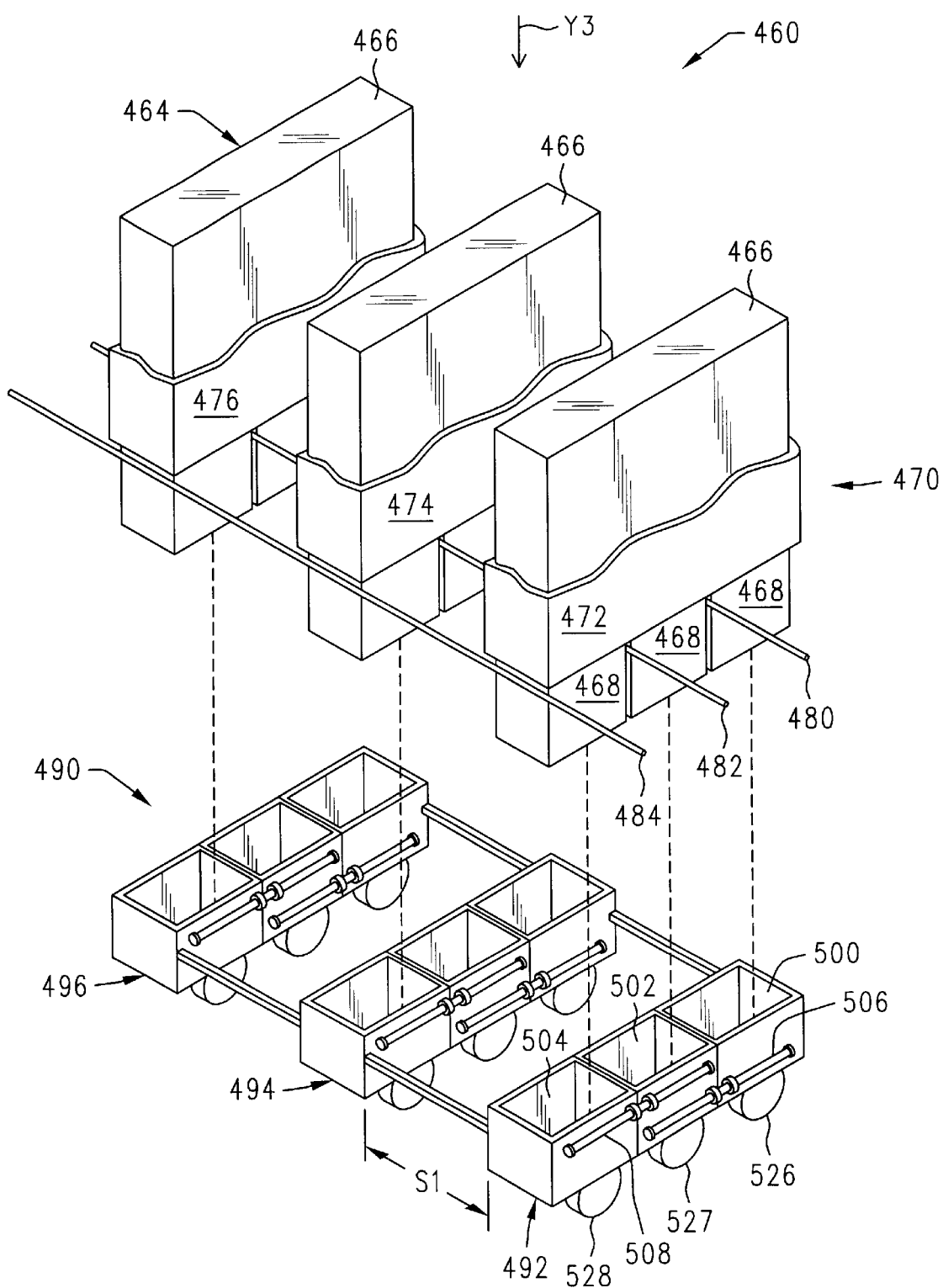
FIG. 13 is an isometric, partially exploded view of an embodiment of the base applicator of the system shown in FIGS. 9 and 10.

As shown in FIGS. 10 and 13–15, the base applicator 460 may comprise a supply station 470, a movable trolley 490, and an adhesive station 540. The supply station 470 may be adapted to store and distribute the lightweight, recyclable/disposable material (such as plastic foam/polystyrene) 464 used to form the base 462 as discussed above. As best shown in FIG. 13, the material 464 may be comprised of individual sheets 466 positioned within and/or inserted into a plurality of individual sheet guides 472, 474, 476. For clarity of description, sheet guide 472 will be detailed herein, it being understood that additional sheet guides 474, 476 may be substantially the same as sheet guide 472. While three sheet guides 472, 474, 476 are shown in FIG. 13, it is to be understood that this number is merely exemplary, and that any number of sheets 466 and sheet guides 472, 474, 476 may be utilized in a base applicator 460.

Figure 14:
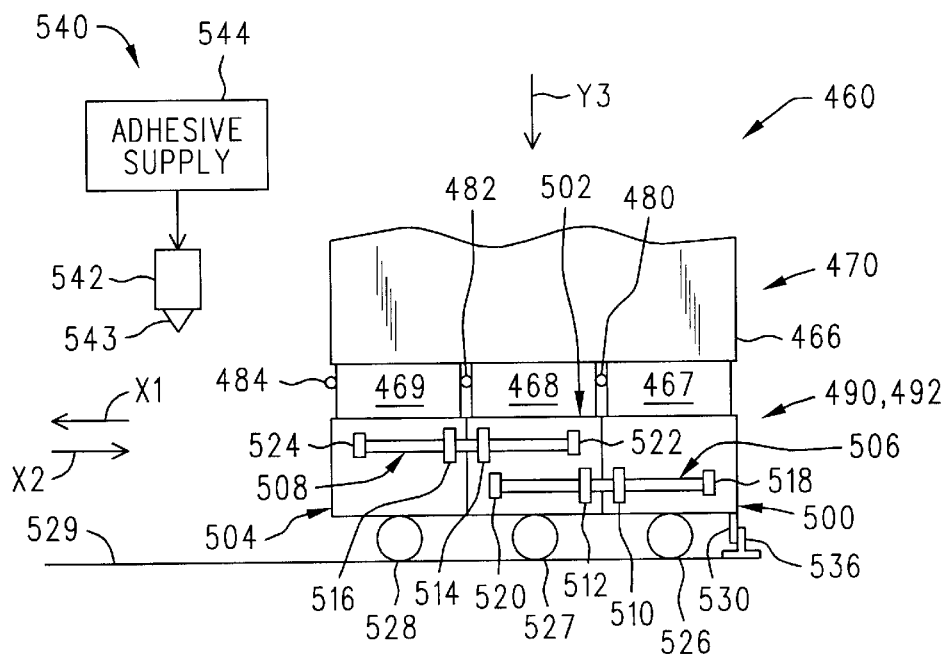
FIG. 14 is a side elevation view of the base applicator of FIG. 13.

A sheet guide 472 may be adapted to receive a plurality of sheets (e.g., 466) which may be provided from a storage area (not shown), or alternatively may be provided on an as-needed basis (e.g., each sheet 466 may be manually fed into the sheet guide 472). The supply station 470 may be further provided with a plurality of cutting instruments such as hot wire cutters 480, 482, 484. The hot wire cutters 480, 482, 484 may be any type conventionally known in the art such as, for example, those manufactured by Pearson Industries of Prattville, Ala. Common configurations of hot wire cutters include a power supply connected to high resistance wire such as tungsten wire. Hot wire cutters are adapted to heat up (to, for example, approximately 1100° F.) and melt through materials which come into contact with the wire and are therefore particular suitable for cutting plastic foam (polystyrene). As described in further detail below, the hot wire cutters 480, 482, 484 may be adapted to slice the sheet 466 of material 464 vertically and horizontally in order to create individual pieces 486 for the base 462 (FIG. 10), which are equivalent to the pieces 106 discussed above relative to FIGS. 2–6. Gravity and the weight of the material may allow the sheets 466 to be moved downwardly Y3 past one or more of the hot wire cutters 480, 482 as shown in FIG. 14, or, alternatively, the sheets 466 may be forced downwardly Y3 past the hot wire cutters using any conventional vertical translation device (not shown). As shown in FIGS. 13–14, when a sheet 466 moves past the hot wire cutters 480, 482, the sheet 466 may be sliced into several elongate portions 468. These portions 468 may then be directed to the trolley 490 which may be temporarily positioned directly beneath the supply station 470 as shown in FIG. 14.

As shown in FIG. 13, the trolley 490 may comprise a plurality of carrier assemblies 492, 494, 496, each carrier assembly corresponding to a sheet guide (carrier assembly 492 corresponding to sheet guide 472; carrier assembly 494 corresponding to sheet guide 474; and carrier assembly 496 corresponding to sheet guide 476). For clarity of description, carrier assembly 492 will be detailed herein; it being understood that additional carrier assemblies 494, 496 may be substantially the same as carrier 492. As shown in FIG. 13, the carrier assemblies 492, 494, 496 may be linked together or manufactured as a single unit within the trolley 490 so that a force applied to the trolley 490 translates all of the carrier assemblies 492, 494, 496.

Figure 15:
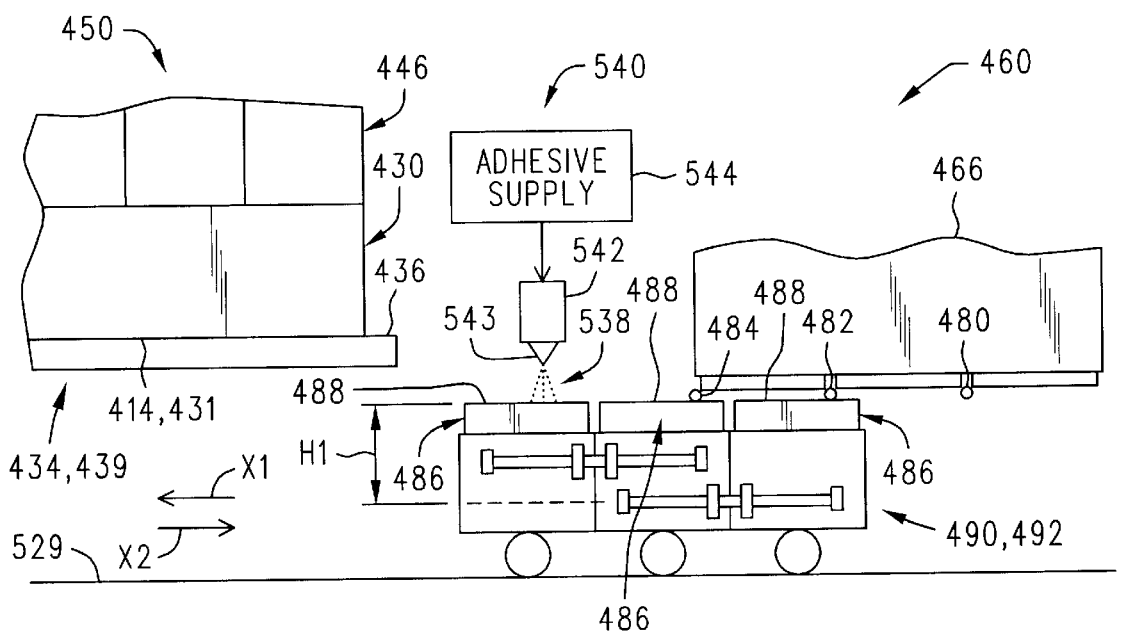
FIG. 15 is a side elevation view of a trolley of the base applicator beneath an adhesive station.
Figure 16:
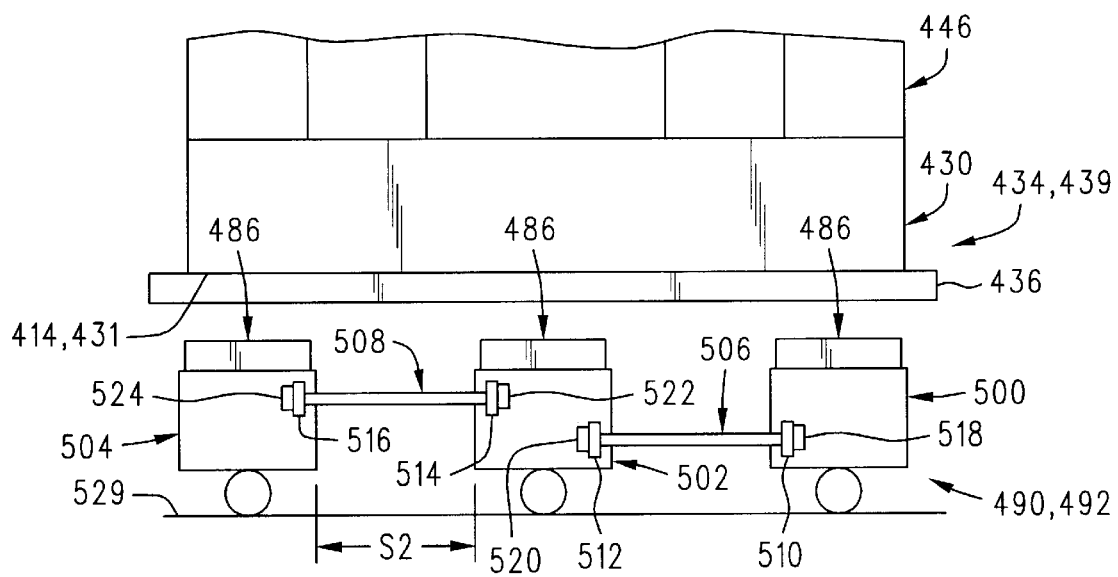
FIG. 16 is a side elevation view of the trolley of the base applicator beneath a load.

A carrier assembly 492 may comprise a plurality of carriers 500, 502, 504 which are each adapted to receive an elongate portion 468 of the sheet 466 from the supply station 470 as shown in FIG. 14. The hot wire cutters 480, 482, 484 may then be used to slice the elongate portions 468 horizontally to an appropriate height H1 (FIG. 15) to create individual pieces 486 for the base 462 (FIG. 10). Specifically, as shown in FIG. 15, the trolley 490 and the sheet guides 472 may be translated in a first horizontal direction X1 away from the supply station 470, toward the lift platform 436, and past the hot wire cutters 480, 482, 484. As the elongate portions 468 travel past the hot wire cutters 480, 482, 484, they are sliced horizontally, thereby creating pieces 486 for the base 462 (FIG. 10). Alternatively, the hot wire cutters 480, 482, 484 (rather than the trolley 490 and sheet guides 472) may be translated in a second horizontal direction X2 (FIG. 14) to slice through the elongate portions 468. In either of these embodiments, the hot wire cutters 480, 482, 484 may be positioned to produce pieces 486 having a uniform height H1 (FIG. 15) as discussed above relative to FIGS. 2–6. The position of the hot wire cutters 480, 482, 484 may be adjustable in order to adjust the height H1 of the pieces 486.

As discussed above relative to FIGS. 2–6, the base (102, FIG. 4; 462, FIG. 10) preferably includes channels (108, FIG. 4; 550, FIG. 18) for receiving the forks (56, FIG. 6) of a conventional forklift. In order to create these channels, the sheet guides 472, 474, 476 and carriers 500, 502, 504 may be spaced apart from one another a distance S1 (FIG. 13) which may be adjustable depending on the desired configuration of the base. The carriers 500, 502, 504 in each carrier assembly 492, 494, 496 may also be separable during translation in direction X1 toward the lift platform 436 in order to create channels (e.g., 108, FIG. 4; 552, FIG. 18). For example, as shown in FIGS. 13–17, the carriers 500, 502, 504 may be linked together by one or more tie rods 506, 508. In an exemplary embodiment, carrier 500 is linked to carrier 502 by tie rod 506, while carrier 502 is linked to carrier 504 by tie rod 508. The carriers 500, 502, 504 may be provided with rod blocks 510, 512, 514, 516 (FIGS. 14 and 16) which are adapted to slidingly receive the tie rods 506, 508. The tie rods 506, 508 may be further provided with stops 518, 520, 522, 524 (FIGS. 14 and 16) on the ends thereof. The stops 518, 520, 522, 524 may be adapted to limit the separation distance S2 (FIG. 16) between the carriers 500, 502 and 502, 504 by contacting the rod blocks 510, 512, 514, 516 upon complete separation of the carriers 500, 502, 504. The carriers 500, 502, 504 may be separated using any conventional separation mechanism such as, for example, an air cylinder-driven or screw-driven mechanism. Translation of the trolley 490, hot wires 480, 482, 484, and/or sheet guides 472, etc., in directions X1 and X2 may also be accomplished using any conventional linear translation mechanism. As shown in FIGS. 10 and 13–17, the trolley 490 may include wheels (e.g., 526, 527, 528) and/or be driven on tracks or rails 529.

Figure 17:
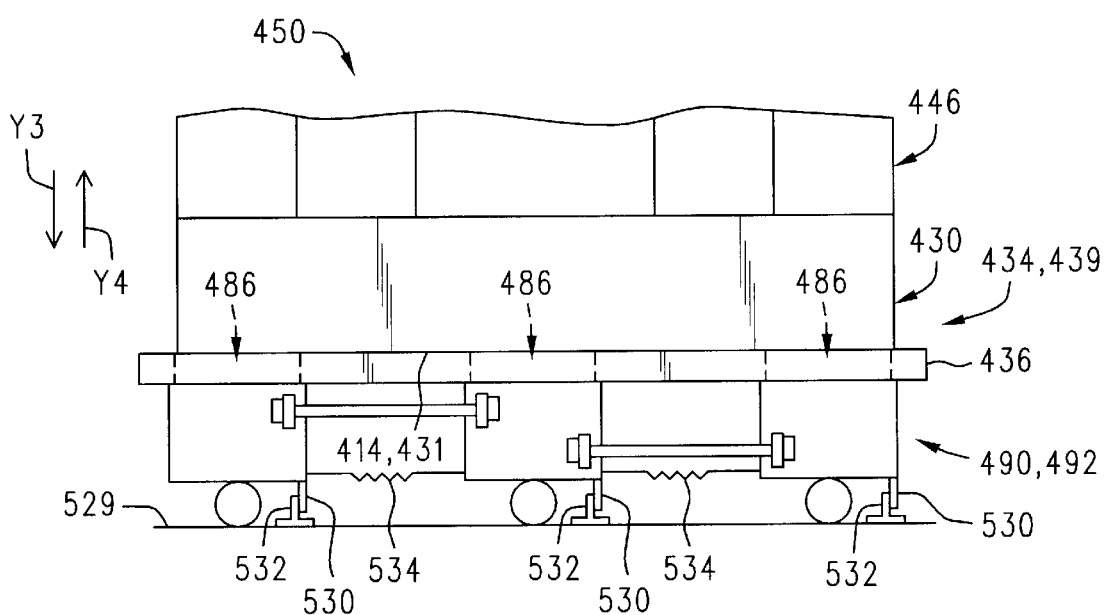
FIG. 17 is a side elevation view of the trolley of the base applicator applying a base to the load.

Alternatively, separation of the carriers 500, 502, 504 may be accomplished using the linear translation of the trolley 490. For example, as shown in FIG. 17, each of the carriers 500, 502, 504 may comprise a tab 530 which is adapted to contact a floor anchor 532 positioned beneath the lift 434 in order to stop translation of each of the carriers 500, 502, 504 at an appropriate location beneath the lift 434 (first, carrier 500, then carrier 502, then carrier 504 as the carriers 500, 502, 504 are translated in direction X1, FIG. 14). Biasing devices 534 may be provided between the carriers 500, 502, 504 to bias carriers 500, 502, 504 toward a non-separated state as shown in FIGS. 14 and 15. Alternatively or additionally, a floor anchor 536 may be provided beneath the supply station 470 which is adapted to contact a tab 530 as shown in FIG. 14. Continued translation of the carriers 502, 504 in direction X2 as the tab 530 contacts the floor anchor 536 causes the carriers 500, 502, 504 to return to a non-separated state.

As noted above relative to pieces 106 shown in FIGS. 2–6, the pieces 106 may be applied to the flexible film 110 on the bottom surface 62 of the layer 54a using a conventional adhesive. Similarly, the pieces 486 (FIGS. 15–17) may be applied to the flexible film 414 on the bottom surface 431 of the wrapped tier 430 using a conventional adhesive. As shown in FIG. 15, the adhesive 538 may be applied to the upper surface 488 of the pieces 486 at an adhesive station 540 which may be positioned, for example, between the supply station 460 and the bottom 439 of the lift 434. The adhesive station 540 may comprise one or more adhesive applicators 542 and at least one supply 544 of adhesive 538. The adhesive applicator(s) 542 may be a conventional adhesive applicator such as, for example, a hot melt adhesive spray gun manufactured under the name "Titan" by Viking Industries, Inc. of New Smyrna Beach, Fla. As shown in FIG. 15, as the trolley 490 is translated past the adhesive station 540, the adhesive applicator(s) 542 may apply adhesive to the upper surface 488 of the pieces 486. In one exemplary embodiment, a separate adhesive applicator 542 (substantially identical to one another) may be utilized for each carrier assembly 492, 494, 496 (FIG. 13). Alternatively, a single adhesive applicator 542 having one or more outlet ports 543 associated with each carrier assembly 492, 494, 496 may be utilized. As an alternative to applying adhesive 538 to the upper surface 488 of the pieces 486, an adhesive 538 may be applied to the bottom surface 431 of the wrapped tier 430, specifically at the locations where the pieces 486 will be pressed on.

An adhesive 538 which may be utilized in the present invention may be, for example, a hot melt adhesive sold under the name "High-Performance Pressure-Sensitive Adhesive" (model no. 3795) manufactured by 3M of St. Paul, Minn. While other adhesives may be utilized, this particular pressure-sensitive hot melt adhesive retains its adhesion properties even after it has cooled. As such, if the system 400 is stopped, the adhesive remains usable for a period of time (e.g., approximately one week). This particular property also allows the adhesive 538 to be applied to either the bottom 431 of the wrapped tier 430 or the upper surface 488 of the pieces 486 at any location between the horizontal wrapping station 410 and the output conveyor 560 and at any time after wrapping the tier 430 and prior to fixedly applying the base 462. Furthermore, this particular adhesive is compatible with a variety of materials. Two of the materials that the aforementioned adhesive is highly compatible with are polyethylene and polystyrene. In one embodiment of the disposable/recyclable pallet 100, polystyrene (plastic foam) is an exemplary material for the base (102, FIGS. 2–6; 462, FIG. 10) and polyethylene is an exemplary material for the flexible film (110, FIGS. 2–6; 414, FIGS. 9–11).

As noted above relative to FIGS. 2–6, as an alternative to using an adhesive, the upper surface 107 on each of the pieces 106 may be heated until that surface 107 is tacky or partially melted. Then, the tacky upper surface 107 may be pressed to the flexible film 110 on the bottom surface 62 of the packages 52. Similarly, the upper surface 488 of each piece 486 may be heated by an infrared heater manufactured by Heatron of Leavenworth, Kans., 66048. The tacky upper surface 488 may then be pressed to the flexible film 414 on the bottom surface 431 of the wrapped tier 430.

As shown in FIG. 17, after an adhesive 538 is applied (or the upper surface 488 of each piece 486 is melted), the pieces 486 may be pressed onto the flexible film 414 on the bottom surface 431 of the wrapped tier 430. To accomplish this, the lift platform 436 may be translated downwardly Y3 as necessary to fixedly attach the pieces 486 to the wrapped tier 430. When the pieces 486 are adequately attached to the wrapped tier 430, the lift platform 436 may be translated upwardly Y4 to the position shown in FIG. 10. Alternatively, the trolley 490 and/or carriers 500, 502, 504 may be translated upwardly Y4 to the wrapped tier 430 in order to attach the pieces 486 to the wrapped tier 430. Then, the trolley 490 and/or carriers 500, etc. may be translated downwardly Y3 to allow the load 450 and pallet 100 to be conveyed.

Figure 18:
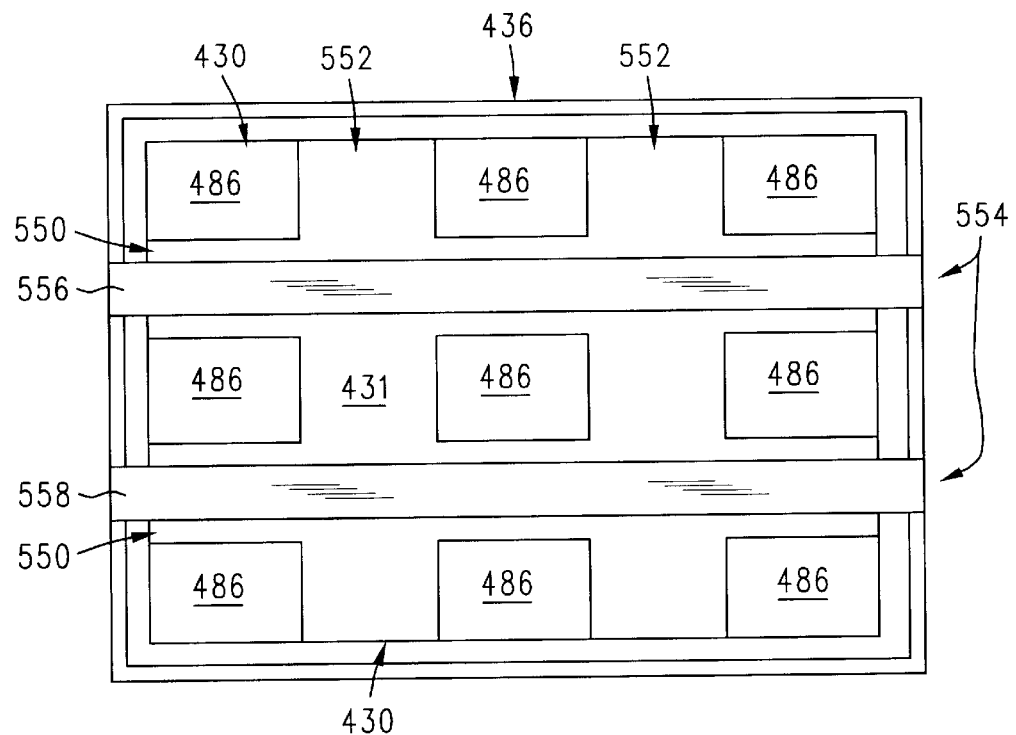
FIG. 18 is a bottom plan view of a lift platform with a disposable/recyclable pallet thereon.

As shown in FIG. 10, the load 450 and pallet 100 may then be conveyed to a vertical wrapping station 570 (if desired) on an output conveyor 560, thereby producing a vertically wrapped load 572 with an attached base 462. The vertical wrapping station 570 may be substantially the same as the vertical wrapping station 384 shown in FIGS. 7 and 8 and described above. The output conveyor 560 may also be substantially the same as output conveyor 398 shown in FIGS. 7 and 8 and described above. In order to convey the load 450 and pallet 100 to the output conveyor 560, the lift platform 436 may comprise a conveyor 554 as shown in FIG. 18. In an embodiment where the pieces 486 of the base 462 (FIG. 10) are attached to the bottom 431 of the wrapped tier 430 while on the lift platform 436, the lift platform conveyor 554 may comprise conveyor portions 556, 558 such as, for example, flat belts, chains, rollers, or the like. As shown in FIG. 18, the conveyor portions 556, 558 may support and convey the wrapped tier 430 at the channels 550 thereof.

Figure 19:
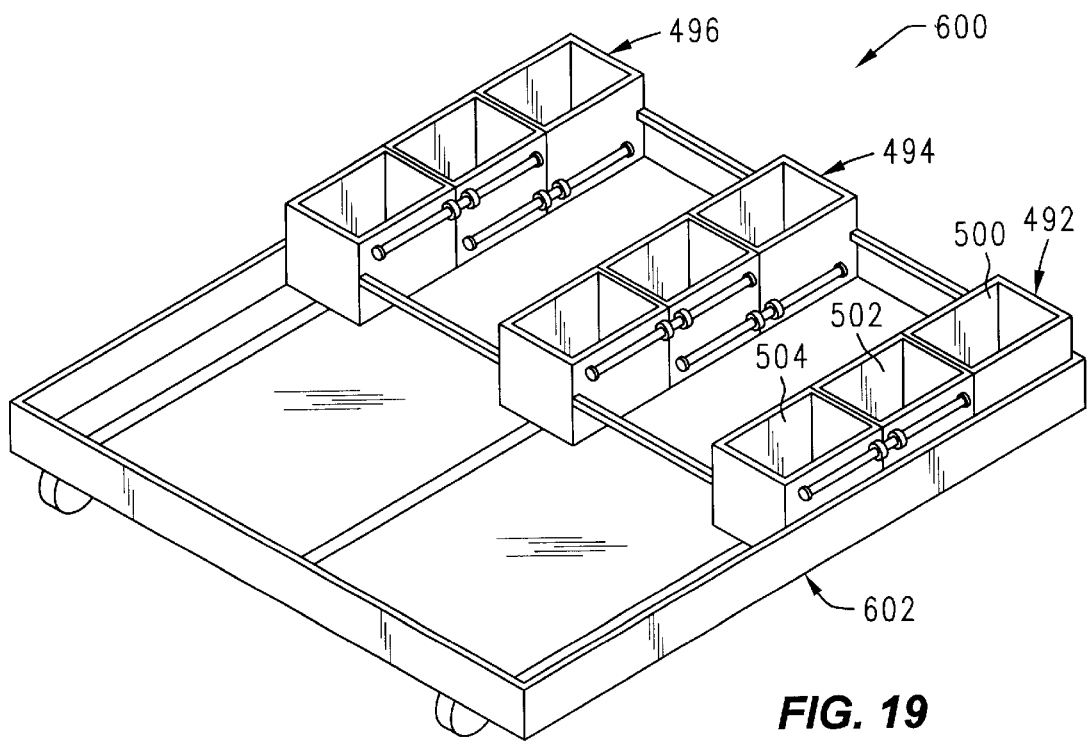
FIG. 19 is an isometric view of the trolley of the base applicator according to an alternative embodiment of the present invention.
Figure 20:
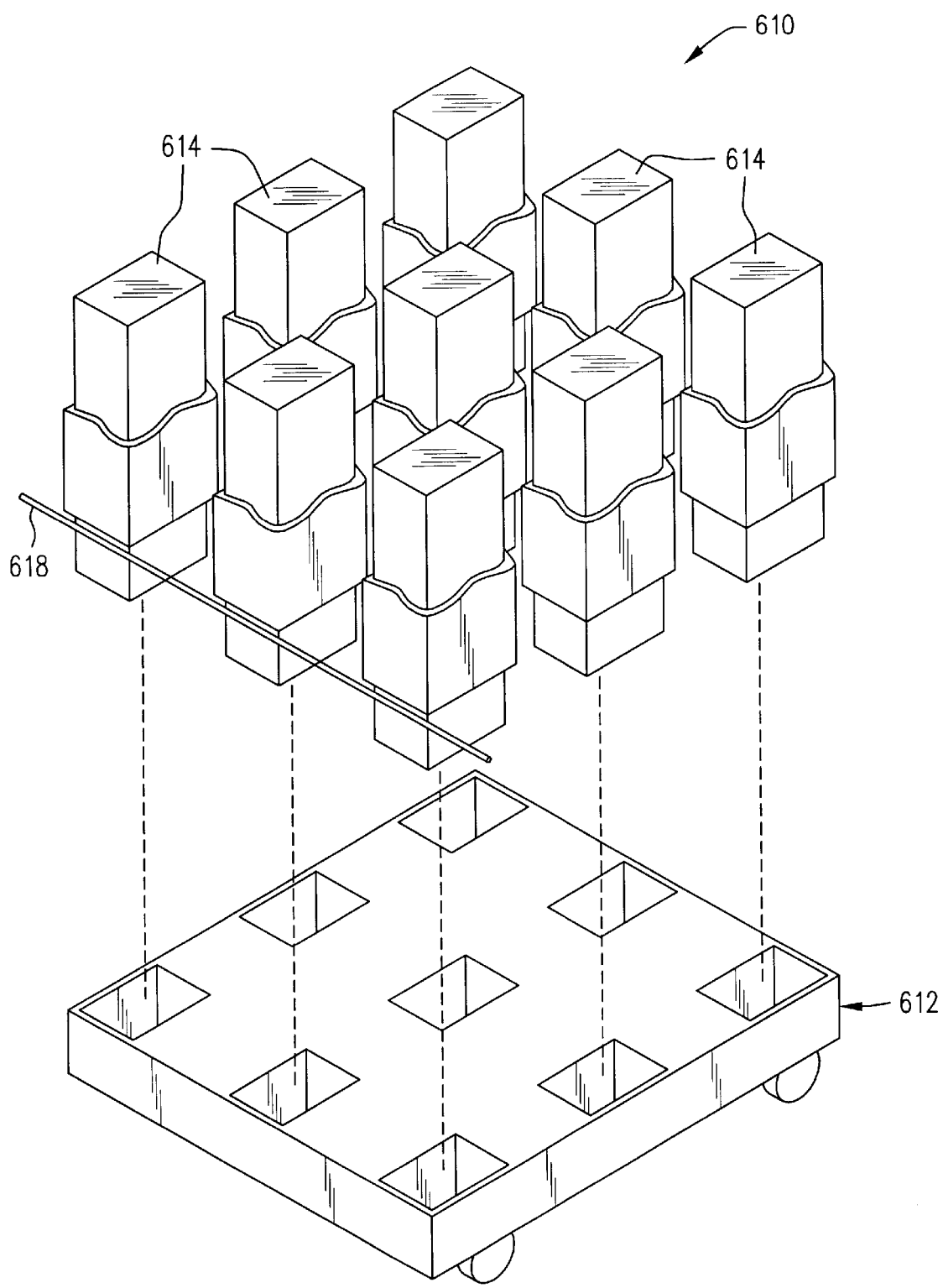
FIG. 20 is an isometric, partially exploded view of the base applicator according to an alternative embodiment of the present invention.

It is to be understood that alternatives may be contemplated with regard to various components of the base applicator 460 without changing the basic function thereof, which is to fixedly apply a base 462 to a wrapped tier 430. For example, as shown in FIG. 19, a base applicator 600 may have the carriers 500, 502, 504 which may be separable as described above which are housed within a trolley 602 that is not separable i.e., the trolley 602 may house the carrier assemblies 492, 494, 496 as well as a separation mechanism (not shown). In other alternative embodiments shown in FIGS. 20 and 21, a base applicator 610 may comprise a carrier and trolley assembly 612 which is fixedly separated (but may be adjustable depending on the desired base configuration) and adapted to receive elongate portions 614 (FIG. 20) of material or pre-cut pieces 616 (FIG. 21) of material. In the embodiment shown in FIG. 20, the elongate portions 614 of material may be further horizontally cut into pieces 616 using, for example, a hot wire cutter 618.

Figure 21:
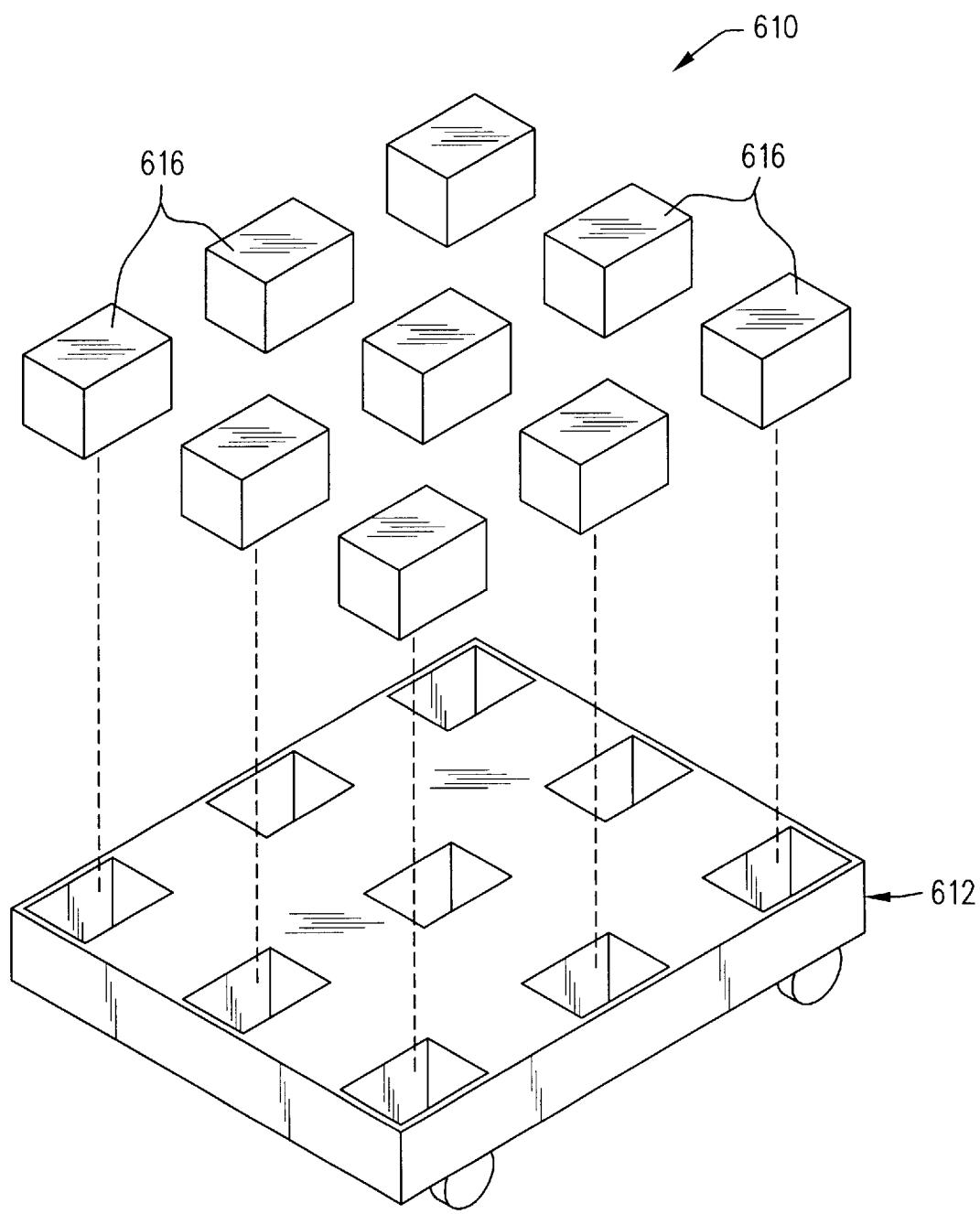
FIG. 21 is an isometric, partially exploded view of the base applicator according to an alternative embodiment of the present invention.
Figure 22:
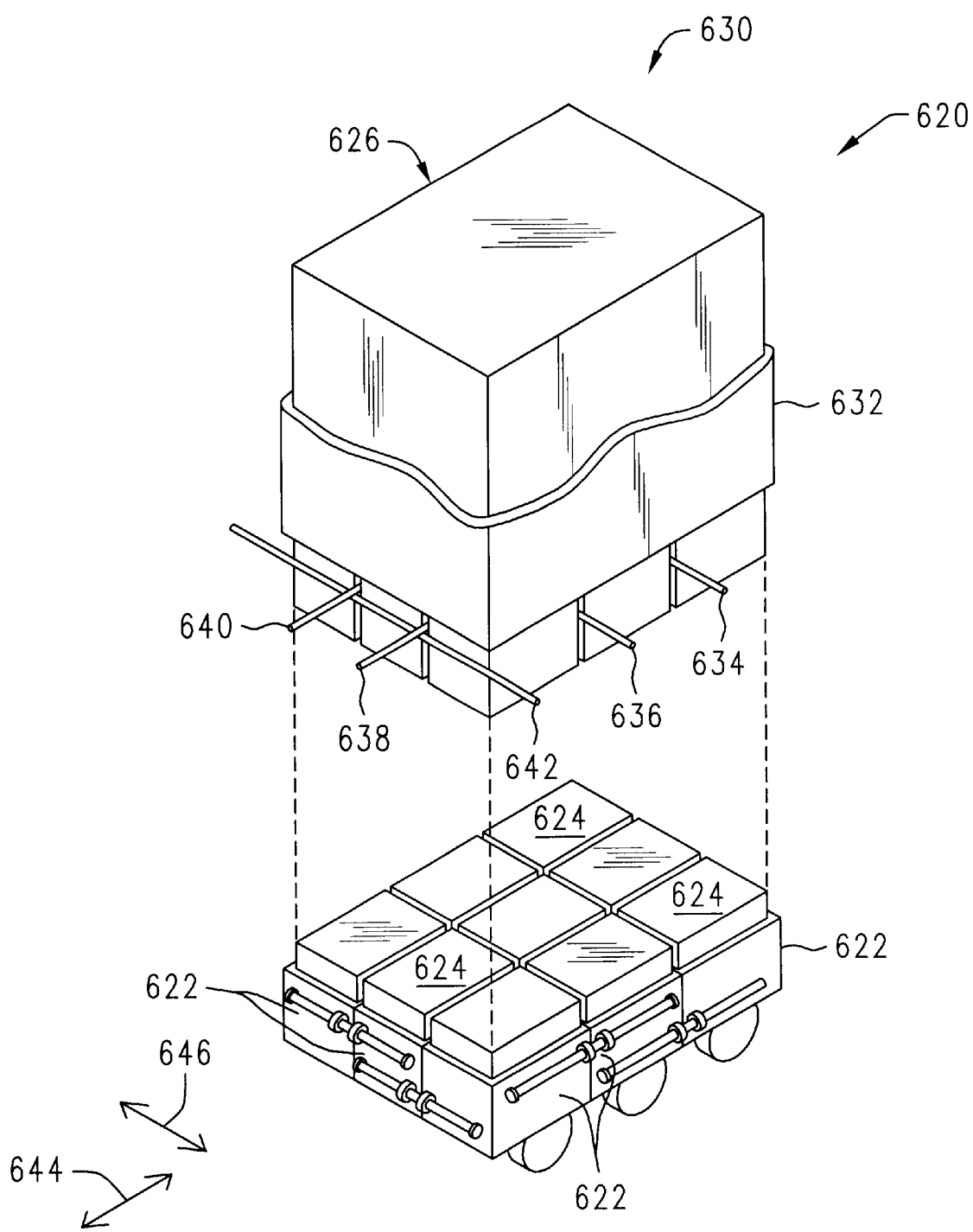
FIG. 22 is an isometric, partially exploded view of the base applicator according to an alternative embodiment of the present invention.

As another alternative shown in FIG. 22, a base applicator 620 may comprise a plurality of carriers 622 which are each adapted to receive a piece 624 of material 626. The pieces 624 may be pre-cut, or, as shown in FIG. 21, a supply station 630 may be provided. The supply station 630 may comprise a sheet guide 632 which is adapted to receive blocks of material 626. The supply station 630 may be further provided with a plurality of cutting instruments such as hot wire cutters 634, 636, 638, 640 which may be used to vertically slice the material 626. Another hot wire cutter 642 may be provided as shown in FIG. 22, and, along with hot wire cutters 634, 636, may be used to slice the material 626 horizontally to create individual pieces 624. The carriers 622 may be adapted to separate in two directions 644, 646 prior to adhering the pieces 622 to the wrapped tier 430 as described above relative to pieces 486. The separation of the carriers 622 may be accomplished in a manner substantially the same as that previously described.

Figure 23:
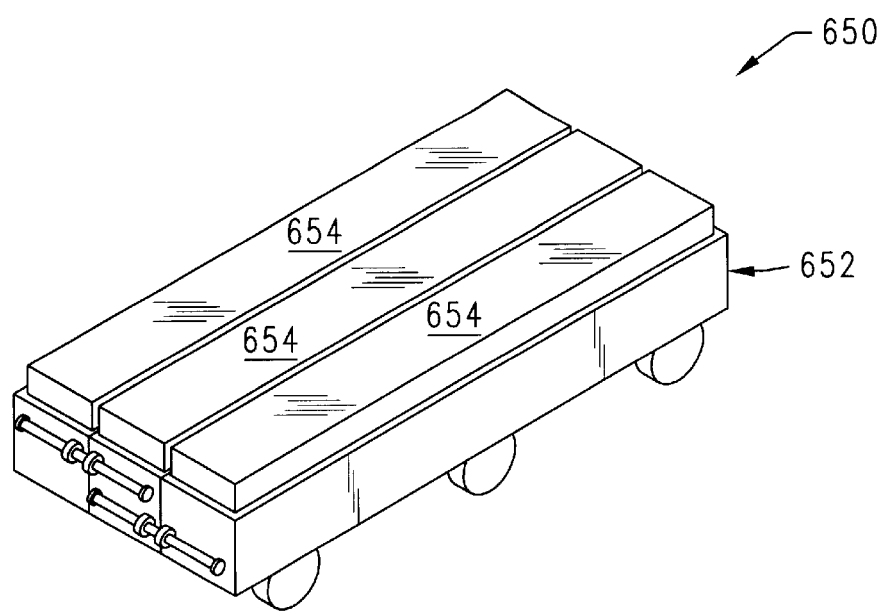
FIG. 23 is an isometric view of the trolley of the base applicator according to an alternative embodiment of the present invention.
Figure 24:
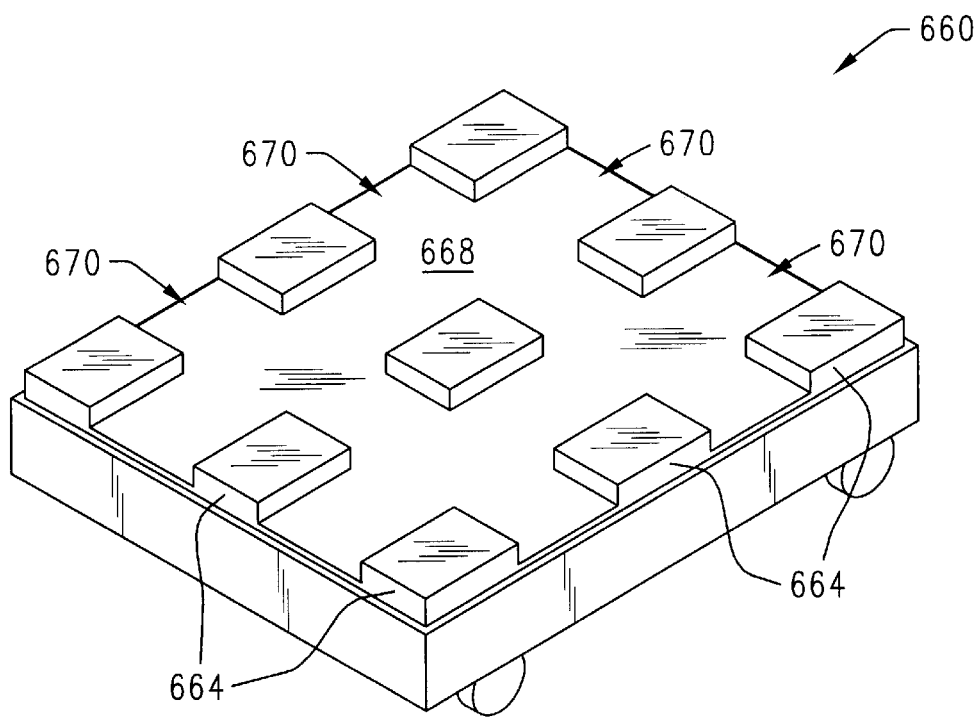
FIG. 24 is an isometric view of the trolley of the base applicator according to an alternative embodiment of the present invention.

As shown in FIG. 23, an alternative base applicator 650 may comprise a carrier and trolley assembly 652 which is adapted to apply a base comprised of elongate pieces 654 of material such as the pieces 206 shown in FIG. 5 and described above. The carrier and trolley assembly 652 may be separable in a single direction 656 (or a fixedly separated—not shown). As shown in FIG. 24, another alternative base applicator 660 may comprise a carrier and trolley assembly 662 which is adapted to receive and translate a base 662 comprised of a single piece of material as described above relative to FIGS. 4 and 5. The base 662 may be comprised of multiple pieces 664 of material connected by thinner material 668 to produce the desired channels 670.

Figure 25:
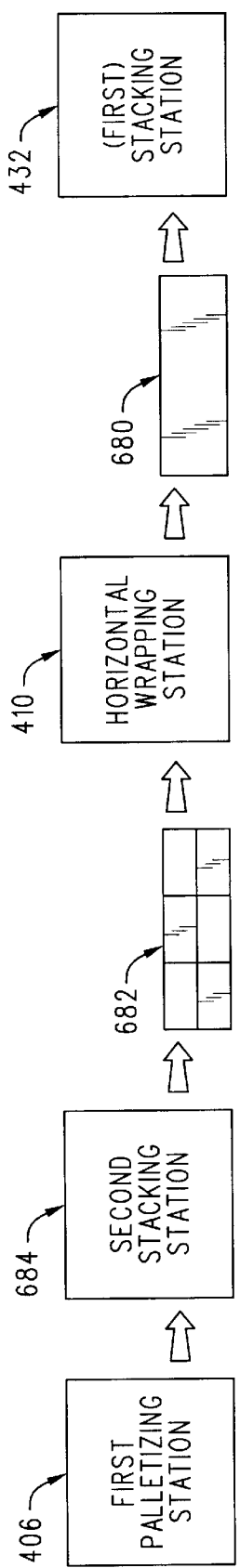
FIG. 25 is a schematic side elevation view of an alternative station in the system of FIG. 9 or 10.

As noted above relative to FIGS. 2–6, two or more layers 54 may be utilized to produce a support structure 104. Thus, as shown in FIG. 25, the system described above may be adapted to produce a support structure 680 comprised of multiple tiers 682 of packages. A first stacking station 684 may be provided between the first palletizing station 406 and the horizontal wrapping station 410. Multiple tiers 682 may be stacked within the first stacking station 684 prior to entering the horizontal wrapping station 688. Otherwise, the system may be identical to the system 400 described above, with the second stacking station 432 shown in FIG. 25 being identical to the stacking station 432 described above.

Figure 26:
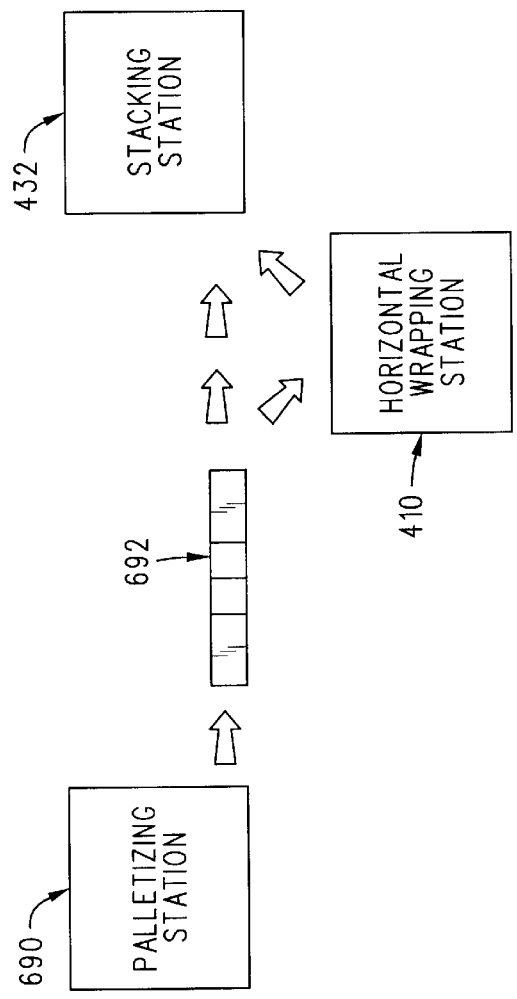
FIG. 26 is a schematic side elevation view of an alternative station in the system of FIG. 9 or 10.

While two palletizing stations 406, 444 are shown in the figures and described above, the system may be adapted to utilize a single palletizing station 690, FIG. 26. Palletized tiers 692 exiting the palletizing station 690 may be conveyed to either the horizontal wrapping station 410 for wrapping or directly to the stacking station 432 for stacking on top of a horizontally wrapped palletized tier. Otherwise, the system may be identical to the system 400 described above.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

I claim:

1. A system for producing a load of packages supported by a disposable/recyclable pallet, comprising:
 a) at least one palletizing station comprising at least one palletizer producing a plurality of unwrapped palletized tiers of packages;
 b) a horizontal wrapping station located downstream from said at least one palletizing station, said horizontal wrapping station comprising at least one horizontal stretch wrapper, said at least one palletizing station and said horizontal wrapping station producing at least one horizontally wrapped palletized tier of packages;
 c) a stacking station located downstream from and accessible to said horizontal wrapping station and said at least one palletizing station, said stacking station comprising a lift which receives said at least one horizontally wrapped palletized tier of packages and said plurality of unwrapped palletized tiers of packages, said plurality of unwrapped palletized tiers of packages being stacked on one another and on said at least one horizontally wrapped palletized tier of packages; and
 d) a base applicator which fixedly applies a base to a bottom surface of said at least one horizontally wrapped palletized tier of packages, thereby producing said disposable/recyclable pallet.

2. The system of claim 1, said at least one horizontal stretch wrapper comprising at least one supply of flexible film oriented along a horizontal flexible film axis, said horizontal wrapping station further comprising a rotating device which re-orients said at least one horizontally wrapped palletized tier so that one of a first horizontal axis and a second horizontal axis of said horizontally wrapped palletized tier parallel to said horizontal flexible film axis, said first horizontal axis being generally perpendicular to said second horizontal axis.

3. The system of claim 2, said horizontal wrapping station comprising a first horizontal stretch wrapper and a second horizontal stretch wrapper located downstream from said first horizontal stretch wrapper, with said rotating device being positioned therebetween.

4. The system of claim 3, each of said first horizontal stretch wrapper and said second horizontal stretch wrapper comprising multiple supplies of flexible film.

5. The system of claim 2, said rotating device being a cross table.

6. The system of claim 2, said rotating device being a bi-directional conveyor.

7. The system of claim 1, said at least one horizontal stretch wrapper comprising multiple supplies of flexible film.

8. The system of claim 1, said base applicator comprising a supply station providing disposable/recyclable material for said base, and further comprising a trolley which receives said disposable/recyclable material.

9. The system of claim 8, said base applicator further comprising an adhesive station at which said base receives adhesive thereon, said adhesive station comprising at least one adhesive applicator and at least one supply of adhesive.

10. The system of claim 9, said base applicator being positioned adjacent to said stacking station, wherein said trolley is translatable between said supply station and said stacking station and said adhesive station is positioned between said supply station and said stacking station.

11. The system of claim 8, said base applicator being positioned adjacent to said stacking station, wherein said trolley is translatable between said supply station and said stacking station.

12. The system of claim 8, said base applicator further comprising a plurality of hot wire cutters which slice said disposable/recyclable material to produce multiple pieces of said base.

13. The system of claim 1, said disposable/recyclable pallet comprising multiple channels between pieces of said base, said lift comprising a lift platform having multiple conveyor portions which support and convey said base within said channels.

14. The system of claim 1 further comprising a vertical wrapping station positioned downstream from said stacking station, said vertical wrapping station comprising at least one vertical stretch wrapper which wraps said load of packages around a vertical axis with flexible film.

15. A system for producing a load of packages supported by a disposable/recyclable pallet comprising at least one horizontally wrapped palletized tier of packages and a base, said system comprising:
 a) a first palletizing station comprising at least one palletizer;
 b) a horizontal wrapping station located downstream from said first palletizing station, said horizontal wrapping station comprising at least one horizontal stretch wrapper having at least one supply of flexible film, said palletizer of said first palletizing station and said horizontal wrapping station producing said at least one horizontally wrapped palletized tier of packages, said flexible film being wrapped around a first horizontal axis and a second horizontal axis of said horizontally wrapped palletized tier of packages, said first horizontal axis being generally perpendicular to said second horizontal axis;
 c) a second palletizing station comprising at least one palletizer producing a plurality of unwrapped palletized tiers of packages;
 d) a stacking station located downstream from and accessible to said horizontal wrapping station and said second palletizing station, said stacking station comprising a lift which receives said at least one horizontally wrapped palletized tier of packages and said plurality of unwrapped palletized tiers of packages, said plurality of unwrapped palletized tiers of packages being stacked on one another and on said at least one horizontally wrapped palletized tier of packages; and
 e) a base applicator which holds said base and fixedly applies said base to a bottom surface of said at least one horizontally wrapped palletized tier of packages.

16. The system of claim 15, said at least one supply of flexible film being oriented along a horizontal flexible film axis, said horizontal wrapping station further comprising a rotating device which re-orients said at least one horizontally wrapped palletized tier so that one of said first horizontal axis and said second horizontal axis of said horizontally wrapped palletized tier is parallel to said horizontal flexible film axis.

17. The system of claim 16, said horizontal wrapping station comprising a first horizontal stretch wrapper and a second horizontal stretch wrapper located downstream from said first horizontal stretch wrapper, with said rotating device being positioned therebetween.

18. The system of claim 17, each of said first horizontal stretch wrapper and said second horizontal stretch wrapper comprising multiple supplies of flexible film.

19. The system of claim 16, said rotating device being a cross table.

20. The system of claim 16, said rotating device being a bi-directional conveyor.

21. The system of claim 15, said at least one horizontal stretch wrapper comprising multiple supplies of flexible film.

22. The system of claim 15, said base applicator comprising a supply station providing disposable/recyclable material for said base, and further comprising a trolley which receives said disposable/recyclable material.

23. The system of claim 22, said base applicator further comprising an adhesive station at which said base receives adhesive thereon, said adhesive station comprising at least one adhesive applicator and at least one supply of adhesive.

24. The system of claim 23, said base applicator being positioned adjacent to said stacking station, wherein said trolley is translatable between said supply station and said stacking station and said adhesive station is positioned between said supply station and said stacking station.

25. The system of claim 22 said base applicator being positioned adjacent to said stacking station, wherein said trolley is translatable between said supply station and said stacking station.

26. The system of claim 22, said base applicator further comprising a plurality of hot wire cutters which slice said disposable/recyclable material to produce multiple pieces of said base.

27. The system of claim 15, said disposable/recyclable pallet comprising multiple channels between pieces of said base, said lift comprising a lift platform having multiple conveyor portions which support and convey said base within said channels.

28. The system of claim 15 further comprising a vertical wrapping station positioned downstream from said stacking station, said vertical wrapping station comprising at least one vertical stretch wrapper which wraps said load of packages around a vertical axis with flexible film.

29. A system for producing a load of packages supported by a disposable/recyclable pallet, comprising:
   a) means for palletizing said packages to produce palletized tiers of packages;
   b) means for wrapping flexible film around a first horizontal axis and a second horizontal axis of at least one of said palletized tiers of packages to produce at least one horizontally wrapped palletized tier of packages;
   c) means for stacking multiple unwrapped palletized tiers of packages on said at least one horizontally wrapped palletized tier of packages, thereby producing said load of packages; and
   d) means for fixedly applying a base to a bottom surface of said horizontally wrapped palletized tier of packages, thereby producing said disposable/recyclable pallet for supporting said load of packages.

30. The system of claim 29 further comprising means for wrapping flexible film around a vertical axis of said load.

31. A method for producing a load of packages supported by a disposable/recyclable pallet, comprising:
   a) at at least one palletizing station, arranging packages into a plurality of unwrapped palletized tiers of packages;
   b) at a horizontal wrapping station, wrapping at least one of said unwrapped palletized tiers of packages with flexible film around a first horizontal axis and a second horizontal axis to produce at least one horizontally wrapped palletized tier of packages, said first horizontal axis being generally perpendicular to said second horizontal axis;
   c) stacking said plurality of unwrapped palletized tiers of packages on said at least one horizontally wrapped palletized tier of packages to produce said load of packages; and
   d) fixedly applying a disposable/recyclable base to a bottom surface of said at least one horizontally wrapped palletized tier of packages to produce said disposable/recyclable pallet.

32. The method of claim 31, wherein said fixedly applying a disposable/recyclable base occurs at any time subsequent to said wrapping at least one of said unwrapped palletized tiers of packages with flexible film.

33. The method of claim 31, wherein said fixedly applying a disposable/recyclable base occurs subsequent to said stacking said plurality of unwrapped palletized tiers of packages on said at least one horizontally wrapped palletized tier of packages.

34. The method of claim 31 further comprising, at a vertical wrapping station, wrapping said load of packages with flexible film around a vertical axis of said load.

35. The method of claim 31, wherein said wrapping at least one of said unwrapped palletized tiers of packages with flexible film around a first horizontal axis and a second horizontal axis to produce at least one horizontally wrapped palletized tier of packages comprises:
   a) wrapping at least one of said unwrapped palletized tiers of packages with flexible film around said first horizontal axis to produce a partially wrapped tier, said flexible film comprising a horizontal flexible film axis which is parallel to said first horizontal axis;
   b) re-orienting said partially wrapped tier so that said horizontal flexible film axis is parallel to said second horizontal axis; and
   c) wrapping said partially wrapped tier with flexible film around said second horizontal axis.

36. The method of claim 31, wherein said wrapping at least one of said unwrapped palletized tiers of packages with flexible film around a first horizontal axis and a second horizontal axis to produce at least one horizontally wrapped palletized tier of packages comprises:
   a) wrapping at least one of said unwrapped palletized tiers of packages with flexible film from a horizontal stretch wrapper around said first horizontal axis to produce at least one partially wrapped tier, said flexible film comprising a horizontal flexible film axis which is parallel to said first horizontal axis;
   b) conveying said at least one partially wrapped tier downstream to a rotating device;
   c) rotating said at least one partially wrapped tier using said rotating device around a vertical axis so that said horizontal flexible film axis is parallel to said second horizontal axis;
   d) conveying said at least one partially wrapped tier upstream to said horizontal stretch wrapper; and
   e) wrapping said at least one partially wrapped tier with flexible film from said horizontal stretch wrapper around said second horizontal axis.

37. The method of claim 31, wherein said wrapping at least one of said unwrapped palletized tiers of packages with flexible film around a first horizontal axis and a second horizontal axis to produce at least one horizontally wrapped palletized tier of packages comprises:
   a) wrapping at least one of said unwrapped palletized tiers of packages with flexible film from a first horizontal stretch wrapper around said first horizontal axis to produce at least one partially wrapped tier, said flexible film comprising a horizontal flexible film axis which is parallel to said first horizontal axis;

b) conveying said at least one partially wrapped tier downstream to a rotating device;

c) re-orienting said at least one partially wrapped tier so that said horizontal flexible film axis is parallel to said second horizontal axis; and d) conveying said at least one partially wrapped tier downstream to a second horizontal stretch wrapper; and e) wrapping said at least one partially wrapped tier with flexible film from a second horizontal stretch wrapper around said second horizontal axis.

38. The method of claim 31, wherein said fixedly applying a disposable/recyclable base to a bottom surface of said at least one horizontally wrapped palletized tier of packages comprises:

a) translating said base from a supply station comprising disposable/recyclable material to a position directly beneath said bottom surface of said at least one horizontally wrapped palletized tier of packages;

b) during said translating, applying adhesive to an upper surface of said base; and c) pressing said upper surface of said base to said bottom surface of said at least one horizontally wrapped palletized tier of packages.

39. The method of claim 38 further comprising, prior to said applying adhesive to an upper surface of said base, slicing said disposable/recyclable material to create multiple pieces of said disposable/recyclable material.

40. The method of claim 38 further comprising:

a) during said pressing said upper surface of said base to said bottom surface of said at least one horizontally wrapped palletized tier of packages, translating downwardly a lift platform having said horizontally wrapped palletized tier of packages thereon, and b) translating said lift platform upwardly in order to translate upwardly said at least one horizontally wrapped palletized tier of packages and said base fixedly adhered thereto.

41. The method of claim 31, wherein said fixedly applying a disposable/recyclable base to a bottom surface of said at least one horizontally wrapped palletized tier of packages comprises:

a) translating said base from a supply station comprising disposable/recyclable material to a position directly beneath said bottom surface of said at least one horizontally wrapped palletized tier of packages;

b) during said translating, heating an upper surface of said base; and c) pressing said upper surface of said base to said bottom surface of said at least one horizontally wrapped palletized tier of packages.

* * * * *